US008467028B2

(12) United States Patent
Onodera

(10) Patent No.: US 8,467,028 B2
(45) Date of Patent: Jun. 18, 2013

(54) ELECTRO-OPTICAL DEVICE AND ELECTRONIC APPARATUS

(75) Inventor: Hiroyuki Onodera, Matsumoto (JP)

(73) Assignee: Japan Display West Inc., Aichi-Ken (JP)

( * ) Notice: Subject to any disclaimer, the term of this patent is extended or adjusted under 35 U.S.C. 154(b) by 1616 days.

(21) Appl. No.: 11/384,435

(22) Filed: Mar. 21, 2006

(65) Prior Publication Data

US 2006/0238450 A1    Oct. 26, 2006

(30) Foreign Application Priority Data

Mar. 29, 2005    (JP) ................................ 2005-094124
Feb. 15, 2006    (JP) ................................ 2006-037559

(51) Int. Cl.
*G02F 1/1345*      (2006.01)
(52) U.S. Cl.
USPC ............................................ 349/151; 349/149
(58) Field of Classification Search
USPC ................................................. 349/149–152
See application file for complete search history.

(56) References Cited

U.S. PATENT DOCUMENTS

| 5,748,267 | A | * | 5/1998 | Natori et al. ................. 349/40 |
| 6,052,170 | A | | 4/2000 | Kobayashi |
| 6,624,857 | B1 | | 9/2003 | Nagata et al. |
| 6,882,378 | B2 | | 4/2005 | Nagata et al. |
| 6,882,397 | B2 | * | 4/2005 | Hayata et al. ................. 349/149 |
| 2004/0150765 | A1 | | 8/2004 | Ueda et al. |
| 2007/0109485 | A1 | * | 5/2007 | Eguchi et al. ................. 349/151 |

FOREIGN PATENT DOCUMENTS

| JP | A-11-030962 | 2/1999 |
| JP | A-11-338376 | 12/1999 |
| JP | A 2000-258790 | 9/2000 |
| JP | A 2001-005016 | 1/2001 |
| JP | A-2004-70137 | 3/2004 |
| JP | 2004-101863 | 4/2004 |
| WO | WO 97/13177 | 10/1997 |

\* cited by examiner

*Primary Examiner* — Dung T. Nguyen
(74) *Attorney, Agent, or Firm* — K&L Gates LLP

(57) ABSTRACT

There is an electro-optical device. The electro-optical device includes: a substrate; a plurality of terminals, a plurality of gate lines, a plurality of source lines, and a plurality of wiring lines that are provided on the substrate; a mounting component that is mounted on the substrate with an anisotropic conductive film interposed therebetween and has a plurality of electrodes; and a counter substrate that is disposed so as to be opposite to the substrate and has a counter electrode. Further, the wiring lines are electrically connected to the counter electrode, the plurality of terminals includes testing terminals that are electrically connected to any one of the gate lines, the source lines, and the wiring lines, the plurality of terminals are disposed at locations, on the substrate, that two-dimensionally overlap the mounting component, and locations that do not overlap the plurality of electrodes of the mounting component, and the plurality of terminals are covered with the anisotropic conductive film that are provided between the mounting component and the substrate.

9 Claims, 12 Drawing Sheets

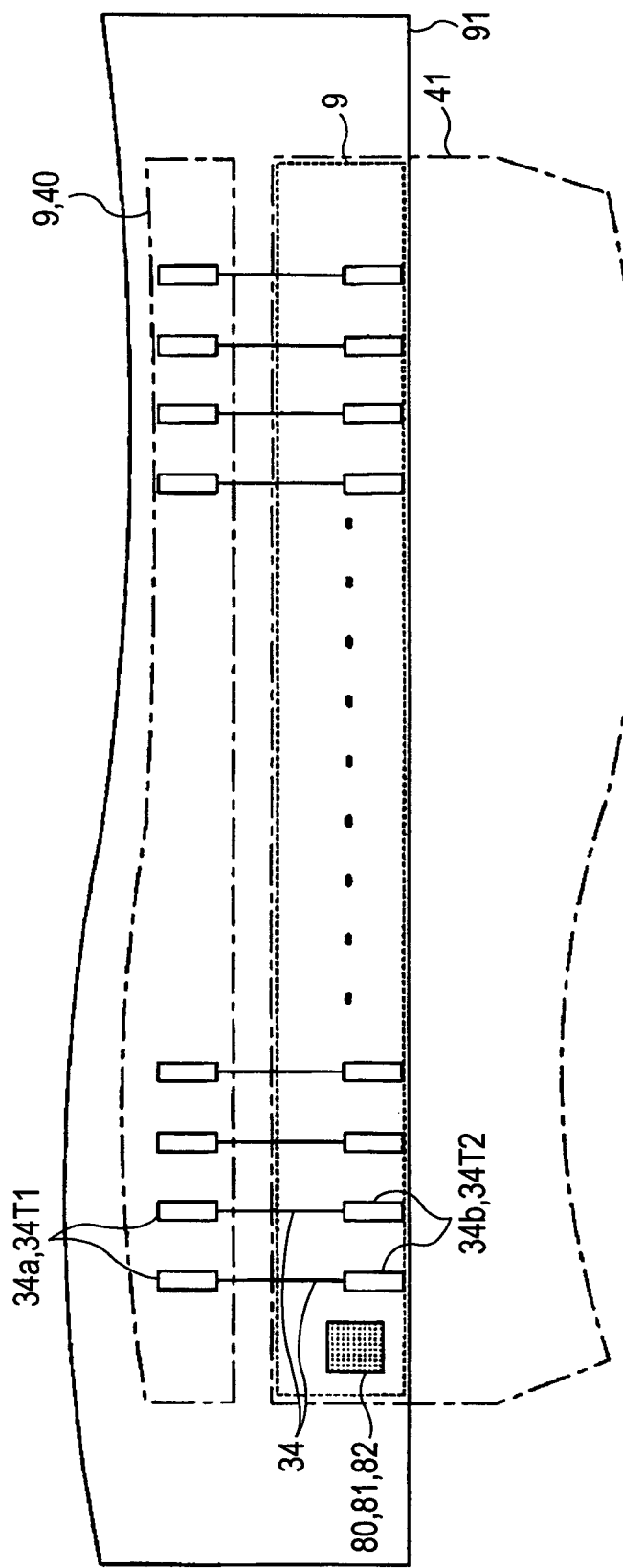

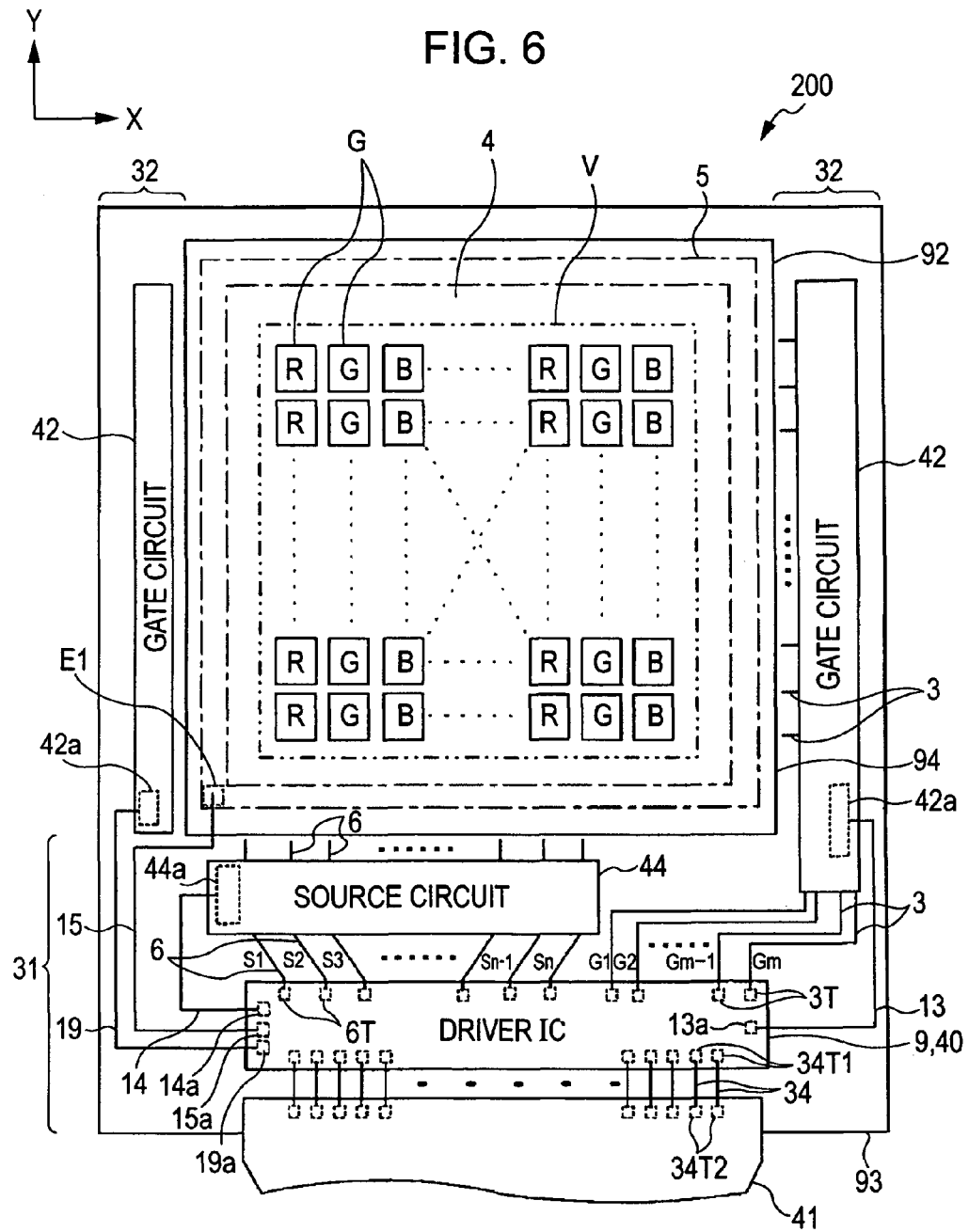

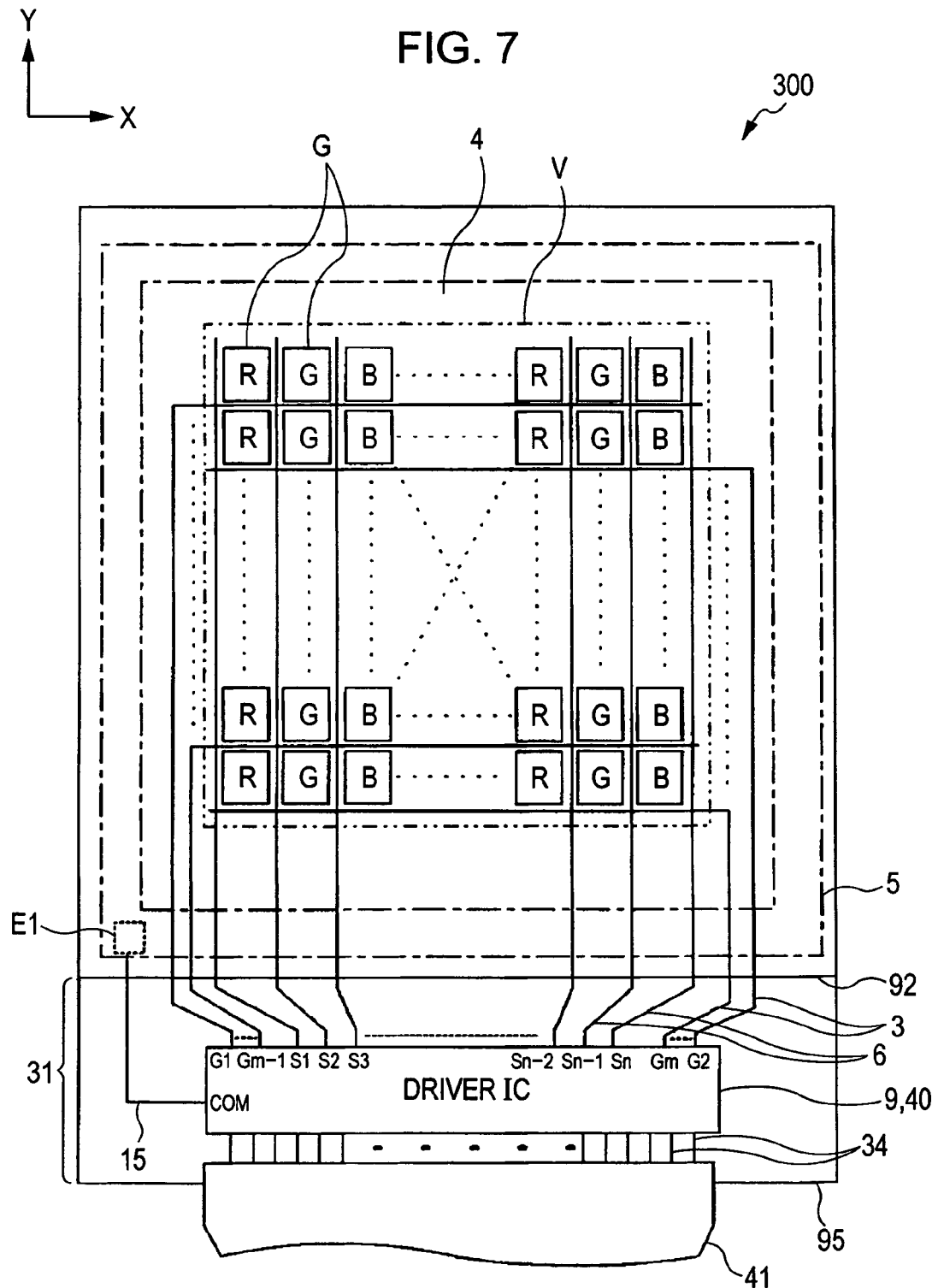

ELECTRO-OPTICAL DEVICE AND ELECTRONIC APPARATUS

BACKGROUND

1. Technical Field

The present invention relates to an electro-optical device that is suitable for display of various information and to an electronic apparatus.

2. Related Art

In general, various electro-optical devices, such as a liquid crystal device, an organic electroluminescent display device, a plasma display device, a field emission display device, or the like, have been known.

Since an active-matrix-type liquid crystal device, which is an example of an electro-optical device and uses a switching element, such as a thin film transistor (hereinafter, referred to as TFT) or the like, has advantages, such as high definition and high-speed responsibility, it has been widely used for a display device of a television, a portable information terminal, or the like.

Such a liquid crystal device has a structure in which an element substrate, on which pixel electrodes, TFT elements, a plurality of scanning lines (gate lines), a plurality of signal lines (source lines), and a driver IC are formed or mounted, and a counter substrate, on which a color filter, a counter electrode, or the like are formed, are bonded to each other through a sealant having a frame shape, and liquid crystal is interposed between the element substrate and the counter substrate.

In addition, in the element substrate, on one end side of each of the plurality of gate lines and the plurality of source lines (hereinafter, simple referred to as 'wiring lines'), terminals, such as OLB (Outer Lead Bonding) pads or the like, are provided. Each of the terminals is used as a testing terminal for testing a state of a display panel in a process of manufacturing the liquid crystal device. In this process, after the plurality of wiring lines are formed on the element substrate, a probe comes into contact with a terminal of each wiring line such that a predetermined voltage is applied to the terminal, and thus it is possible to test a state of the display panel.

Examples of a liquid crystal device, in which this kind of test can be performed, have been disclosed in JP-A-2001-5016 and JP-A-2000-258790. In a liquid crystal device disclosed in JP-A-2001-5016, an extending portion, which extends to an IC mounting region of a substrate extending portion, is provided in wiring patterns linked to electrodes that form a liquid crystal display region. In addition, a testing contact connector comes into contact with the extending portion, and thus it is tested whether a testing image can be displayed. In the meantime, in a liquid crystal device disclosed in JP-A-2000-258790, a lightening testing region is formed in which an insulating layer is not formed on an extending portion of a substrate, and thus the lightening test can be performed by using an electrode extending portion even if an insulating layer has been formed on the extending portion of the substrate. In addition, in this liquid crystal device, after the lightening test is performed, the electrode extending portion is molded with a mold member.

Even in any one of the above-mentioned liquid crystal devices, a probe directly comes into contact with an electrode portion, such as a terminal of a wiring line, an extending portion or an electrode extending portion, so that a state of a display panel can be tested. Therefore, when the state of the display panel is tested, the corresponding electrode portion may be damaged, which results in a bad effect on a mounting quality of a wiring line or the like. In addition, in this liquid crystal device, since the electrode portion is exposed to the outside, a foreign material or water may easily permeate into the corresponding electrode portion. In addition, due to the contamination of the corresponding electrode portion, shorting occurs between the electrode portions or electrolytic corrosion occurs in the electrode portion, which results in lowering corrosion resistance. In addition, as in the above-mentioned liquid crystal device, only the molding of the electrode extending portion cannot resolve the above-mentioned problem for the deterioration of the corrosion resistance in the electrode extending portion. In addition, in a case in which various wiring lines are disposed in the substrate extending portion, when the wiring line is exposed to the outside, a foreign material or moisture may easily adhere to the wiring line. In addition, due to the contamination of the wiring line, shorting occurs between the wiring lines or electrolytic corrosion occurs in the wiring lines, which results in lowering corrosion resistance. In addition, only the molding of the wiring lines cannot resolve the above-mentioned problem for the deterioration of the corrosion resistance in the wiring lines.

SUMMARY

An advantage of some aspects of the invention is that it provides an electro-optical device which is capable of improving corrosion resistance of a testing terminal for testing a state of a display panel and various wiring lines, and an electronic apparatus.

According to a first aspect of the invention, there is provided an electro-optical device. An electro-optical device includes: a substrate; a plurality of terminals, a plurality of gate lines, a plurality of source lines, and a plurality of wiring lines that are provided on the substrate; a mounting component that is mounted on the substrate with an anisotropic conductive film interposed therebetween and has a plurality of electrodes; and a counter substrate that is disposed so as to be opposite to the substrate and has a counter electrode. Further, the wiring lines are electrically connected to the counter electrode, the plurality of terminals includes testing terminals that are electrically connected to any one of the gate lines, the source lines, and the wiring lines, the plurality of terminals are disposed at locations, on the substrate, that two-dimensionally overlap the mounting component, and locations that do not overlap the plurality of electrodes of the mounting component, and the plurality of terminals are covered with the anisotropic conductive film that are provided between the mounting component and the substrate.

The electro-optical device according to the first aspect of the invention includes a substrate made of glass, a plurality of terminals, gate lines, source lines, and wiring lines that are provided on the substrate, a mounting component that has a plurality of input/output electrodes mounted on the substrate with an anisotropic conductive film (ACF) interposed therebetween, and a counter substrate that is disposed so as to be opposite to the substrate and has a counter electrode. In this case, the wiring line is electrically connected to the counter electrode. In preferred embodiments, an IC of a driver IC or a flexible printed board can be used as the mounting component.

In the electro-optical device according to the first aspect of the invention, the plurality of terminals includes a testing terminal that is electrically connected to the gate line, the source line or the wiring line. Accordingly, a probe comes into contact with testing terminals of the gate line, the source line, and the wiring line, so that a predetermined voltage is applied to the testing terminals, thereby testing a state of the display panel of the electro-optical device. In addition, the plurality of terminals are disposed at locations, on the substrate, that overlap the mounting component in plan view, and locations that do not overlap the plurality of input/output electrodes of the mounting component, and the plurality of terminals are covered with the anisotropic conductive film that are provided between the mounting component and the substrate. Thereby, the plurality of terminals including the testing terminal are protected in an overlapping manner by a hardened anisotropic conductive film and the mounting component. Accordingly, it is possible to prevent a foreign material or moisture from adhering to the plurality of terminals including the testing terminal. In addition, it is possible to prevent the plurality of terminals from being contaminated. As a result, a short circuit can be prevented from occurring between the terminals (including between the testing terminals), and the corrosion resistance of the plurality of terminals (including electrolytic corrosion) can be improved.

Preferably, a plurality of insulating layers are laminated on the substrate, and the plurality of terminals include connection terminals that connects wiring lines covered with one insulating layer and wiring lines covered with another insulating layer. Thereby, it is possible to easily connect the wiring line covered with one insulating layer and the wiring line covered with another insulating layer through the connection terminal. Further, the connection terminal can be easily connected to each of the input/output electrodes of the driver IC.

Preferably, the electro-optical device further includes: first wiring lines that are formed on the substrate; a first insulating layer that covers the first wiring lines; second wiring lines that are formed on the first insulating layer; and a second insulating layer that covers the second wiring lines. Preferably, the plurality of terminals include connection terminals that electrically connect the first wiring lines and the second wiring lines through contact holes provided in the first insulating layer and the second insulating layer.

Preferably, the plurality of source lines and the plurality of the gate lines are provided, a source circuit and gate circuit are formed on the substrate, the source circuit driving the plurality of source lines, the gate circuit driving the plurality of gate lines, the source circuit has a switching circuit that selectively connects any source line of the plurality of source lines and one wiring line, and the gate circuit has another switching circuit that selectively connects any gate line of the plurality of gate lines and another wiring line, and the plurality of terminals include a testing terminal that is provided at one end of each of one wiring line and another wiring line.

According to this aspect, the source circuit for driving the plurality of source lines and the gate circuit for driving the plurality of data lines are formed on the substrate. The source circuit has a switching circuit that selectively connects any source line of the plurality of source lines and one wiring line. In addition, the gate circuit has another switching circuit that selectively connects any gate line of the plurality of gate lines and another wiring line. Further, the plurality of terminals include the testing terminal that is provided at one end of one wiring line and another wiring line.

Thereby, in a process of testing a state of the display panel of the electro-optical device, the probe comes into contact with the testing terminal, so that a predetermined voltage is applied to the corresponding testing terminal. As a result, the state of the display panel can be tested without the probe coming into contact with the terminals of all of the source lines and all of the gate lines. Therefore, time needed for testing the state of the display panel can be shortened. In addition, since the testing terminal is protected in an overlapping manner by the anisotropic conductive film and the mounting component, the corrosion resistance of this testing terminal can be improved.

Preferably, on the gate lines, the source lines, and the wiring lines, terminals, which are electrically connected to the electrodes of the mounting component, are provided, and the plurality of terminals includes testing terminals that are provided at end portions of the gate lines, the source lines, and the wiring lines.

According to this aspect, the electro-optical device includes the counter substrate that is disposed so as to be opposite to the substrate and has a counter electrode. In addition, on the substrate, the plurality of gate lines, the plurality of source lines, and the plurality of wiring lines that are connected to the counter electrode are provided. In addition, on the plurality of gate lines, the plurality of source lines, and the plurality of wiring lines, a terminal is provided which is electrically connected to the electrode of each mounting component. In addition, the plurality of terminals include a testing terminal that is formed at end portions of the plurality of gate lines, the plurality of source lines, and the plurality of wiring lines. Accordingly, corrosion resistance of this testing terminal can be improved.

According to a second aspect of the invention, there is provided an electro-optical device having a substrate. The electro-optical device having a substrate includes: gate lines that are provided on the substrate; a first insulating layer that is disposed on the gate lines; source lines that are disposed on the first insulating layer and cross the gate lines; relay wiring lines that are provided on the same layer as the source lines; a second insulating layer that is disposed on the source lines and the relay wiring lines; connection wiring lines that are disposed on the second insulating layer, and electrically connect the gate lines and the relay wiring lines through first contact holes and second contact holes, each of the first contact holes being provided at locations of the first insulating layer and the second insulating layer which overlap a part of the gate lines, each of the second contact holes being provided at locations of the second insulating layer which overlap a part of the relay wiring lines; terminals that are electrically connected to the relay wiring lines; and a mounting component that has electrodes that are disposed on the substrate with an adhesive member interposed therebetween and electrically connected to the terminals. Further, the connection wiring lines are covered with the adhesive member.

According to this aspect, the gate line covered with one insulating layer and the relay wiring line covered with another insulating layer can be easily connected to each other through the connection wiring line. The connection wiring line is disposed at locations, on the substrate, which overlap the mounting component in plan view and does not overlap the plurality of input/output electrodes of the mounting component. The connection wiring line is covered with the anisotropic conductive film disposed below the mounting component. Thereby, the connection wiring line is protected in an overlapping manner by a hardened anisotropic conductive film and the mounting component. Accordingly, it is possible to prevent a foreign material or moisture from adhering to the connection wiring line. In addition, it is possible to prevent the connection wiring line from being contaminated. As a result, a short circuit can be prevented from occurring between the respective connection wiring lines, and the corrosion resistance of the connection wiring line (including electrolytic corrosion) can be improved.

Preferably, the terminal is electrically connected to the relay wiring line through a third contact hole that is provided in the second insulating layer.

According to a third aspect, there is provided an electro-optical device having a substrate. The substrate includes: a plurality of gate lines; first testing terminals; first wiring lines that are electrically connected to the first testing terminals; gate line driving circuits that have first switching circuits which selectively connects any gate line of the plurality of gate lines and the first wiring line, and drive the plurality of gate lines; a plurality of source lines that cross the plurality of gate lines; second testing terminals; second wiring lines that are electrically connected to the second testing terminals; a source line driving circuit that has a second switching circuit which selectively connects any source line of the plurality of source lines and the second wiring line, and drives the plurality of source lines; and a mounting component that is mounted through a an adhesive member. Further, the first testing terminal and the second testing terminal are covered with the adhesive member.

Preferably, the mounting component has a plurality of electrodes, the substrate includes a gate terminal that is electrically connected to one of the plurality of electrodes, a gate wiring line that is electrically connected to the gate terminal, a source terminal that is electrically connected to another electrode of the plurality of electrodes, and a source wiring line that is electrically connected to the source terminal. Further, the gate line driving circuit is electrically connected to the gate wiring line, and the source line driving circuit is electrically connected to the source wiring line.

Preferably, the mounting component is a semiconductor device.

Preferably, the mounting component is a circuit board.

According to a fourth aspect of the invention, there is provided an electronic apparatus including the electro-optical device as a display unit.

BRIEF DESCRIPTION OF THE DRAWINGS

The invention will be described with reference to the accompanying drawings, wherein like numbers reference like elements.

FIG. 5 is a partial enlarged plan view illustrating peripheral portions of an FPC of an element substrate according to a first embodiment of the invention.

FIG. 6 is a plan view schematically illustrating a structure of a liquid crystal device according to a second embodiment of the invention.

FIG. 7 is a plan view schematically illustrating a structure of a liquid crystal device according to a third embodiment of the invention.

DESCRIPTION OF EXEMPLARY EMBODIMENTS

First Embodiment

Structure of Liquid Crystal Device

Figure 1:
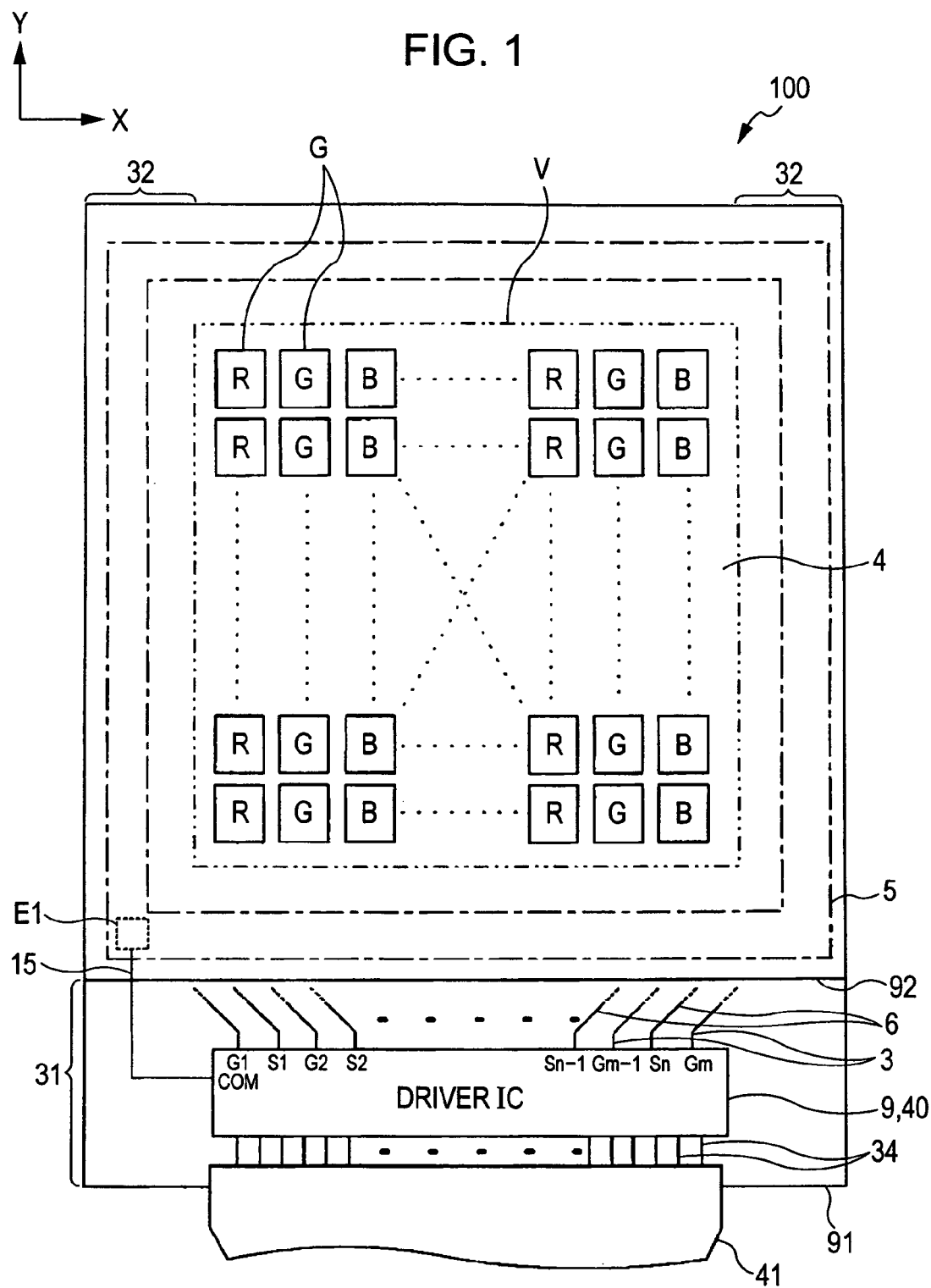
FIG. 1 is a plan view schematically illustrating a structure of a liquid crystal device according to a first embodiment of the invention.

FIG. 1 is a plan view schematically illustrating a structure of a liquid crystal device 100 according to a first embodiment of the invention. In FIG. 1, a longitudinal direction of the paper is referred to as a Y direction, and a horizontal direction of the paper is referred to as an x direction. In addition, for convenience, only a minimal number of constituent elements are shown in FIG. 1.

In this case, the liquid crystal device 100 according to the first embodiment corresponds to an active-matrix-driven liquid crystal device which uses a TFT (thin film transistor) element as a switching element.

As shown in FIG. 1, the liquid crystal device 100 includes an element substrate 91, a color filter substrate 92 that is disposed so as to be opposite to the element substrate 91 and bonded to the element substrate 91 through a sealant 5 having a frame shape, and a liquid crystal layer 4 that has liquid crystal sealed inside the sealant 5.

In the element substrate 91, a first insulating layer 17 (see FIG. 4), a second insulating layer 18 (see FIG. 4), a plurality of gate lines 3, a plurality of source lines 6, a plurality of TFT elements 30 (see FIG. 2), a plurality of pixel electrodes 10 (see FIG. 2), a plurality of external circuit connecting wiring lines 34, a driver IC 40 that serves as an aspect of a semiconductor device, an FPC 41 (flexible printed circuit) that serves as an aspect of a circuit board, or the like are formed or mounted.

Specifically, on an inner surface of the element substrate 91, a plurality of gate lines 3, which correspond to address numbers of G1, G2, . . . , Gm–1, and Gm (m is a natural number), are formed. The gate lines 3 are electrically connected to output-side electrodes (bumps) of the driver IC 40. In addition, the gate lines 3 are formed such that they sequentially lead from the locations corresponding to the driver IC 40 to an extending region 31 (which will be described in detail below) and a frame region 32 (which will be described in detail below), and extend in an X direction between pixel regions G that are adjacent to each other in a Y direction in an effective display region V (which will be described in detail below). Further, on a part of the inner surface of the element substrate 91 and inner surfaces of the plurality of gate lines 3, a first insulating layer 17 having an insulating property is formed with a predetermined thickness.

On the first insulating layer, a plurality of source lines 6 that correspond to address numbers of S1, S2, . . . Sn–1, and Sn (n is a natural number) are formed. The source lines 6 are electrically connected to output-side electrodes (bumps) of the driver IC 40. In addition, the source lines 6 are formed such that they sequentially lead from the locations corresponding to the driver IC 40 to the extending region 31, and extend in a Y direction between pixel regions G that are adjacent to each other in an X direction in the effective display region V. Further, on inner surfaces of the first insulating layer and the plurality of source lines 6, a second insulating layer 18 having an insulating property is formed with a predetermined thickness.

In a region corresponding to an intersection between each gate line 3 and each source line 6 (hereinafter, referred to as 'pixel region G'), a TFT element 30 serving as a switching element, and a pixel electrode 10 which is made of a transparent conductive material, such as ITO or the like, are formed. A region where a plurality of pixel regions G are disposed in a matrix in an x direction and a Y direction corresponds to an effective display region V (a region surround by two-dotted chain lines). In the effective display region V, images, such as characters, numerals, figures, or the like, are displayed. In addition, an outside region of the effective display region V becomes a frame region 32 which is not related to display. In addition, on the inner surfaces of the second insulating layer 18, the TFT element 30, and the pixel electrode 10, an alignment film (not shown) is formed.

Further, as shown in FIG. 1, the element substrate 91 has an extending region 31 that extends more toward an outer side than one side of the color filter substrate 92. On the inner surface of the element substrate 91 corresponding to the extending region 31, the plurality of gate lines 3 and the first insulating layer 17 are formed. The plurality of gate lines 3 are covered with the first insulating layer 17 and disposed and located at the same layer as the first insulating layer 17. On the first insulating layer 17, wiring lines 15 (which will be described below), the plurality of source lines 6, and the second insulating layer 18 are respectively formed. The wiring lines 15 and the plurality of source lines 6 are covered with the second insulating layer 18 and located at the same layer as the second insulating layer 18. On the second insulating layer 18 that corresponds to the extending region 31, the driver IC 40 is mounted with the anisotropic conductive film 9 (see FIG. 4) serving as one aspect of the adhesive member interposed therebetween. As the adhesive member, not only the anisotropic conductive film 9 but also an NCF (Non-Conductive Film) can be used.

The driver IC 40 includes input/output electrodes (bumps) 40a, 40b, 40c, and 40d (see FIG. 3), a gate circuit (not shown) that drives the plurality of gate lines 3, a source circuit (not shown) that drives the plurality of source lines 6, and a counter electrode driving circuit (not shown) that drives the counter electrode (which will be described in detail below) through the wiring line 15. The output-side electrodes (bump) of the driver IC 40 are electrically connected to the plurality of source lines 6, the plurality of gate lines 3, and the wiring lines 15 through the anisotropic conductive film 9. In addition, the gate line 3 and the source line 6 are alternately electrically connected to the output-side electrode (bump) of the driver IC 40.

In addition, on the first insulating layer 17 which corresponds to the extending region 31, a plurality of external connection wiring lines 34 are formed. The respective external connection wiring lines 34 are disposed in an X direction at predetermined gaps and covered with the second insulating layer 18. For this reason, the respective external circuit connecting wiring lines 34 are located at the same layer as the second insluting layer 18. One end of each of the external circuit connecting wiring lines 34 is electrically connected to the input-side electrode (bump) of the driver IC 40, and the other end of each of the external circuit connecting wiring lines 34 is electrically connected to the plurality of terminals (not shown) that are formed in the FPC 41. Thereby, a signal or power is supplied from an electronic apparatus, such as, for example, a cellular phone or an information terminal, to the liquid crystal device 100.

In the meantime, in the color filter substrate 92, a colored layer of any one of R (red), G (green), and B (blue) is disposed at the location corresponding to the pixel region G, a counter electrode (not shown), which is made of a transparent material, such as ITO or the like, is formed on the colored layer, and an alignment film (not shown) is formed on the counter electrode. The counter electrode is electrically connected to one end of the wiring line 15 in a vertical direction at a location of a corner of the sealant 5 (region E1). Thereby, the counter electrode can be applied with a predetermined voltage through the wiring line 15 from the driver IC 40. The counter electrode has, for example, a predetermined potential.

Structure of Equivalent Circuit

Figure 2:
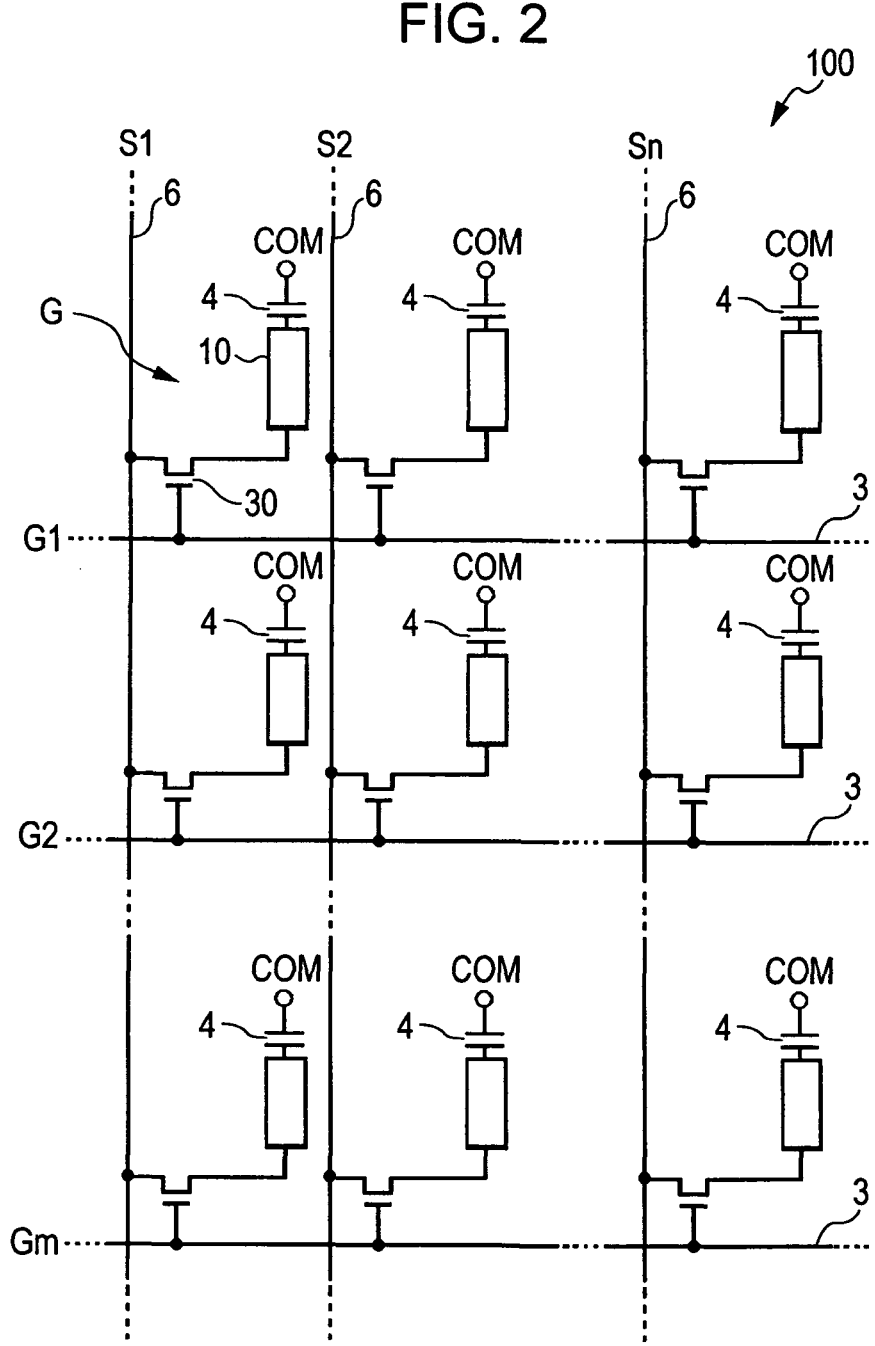
FIG. 2 is an equivalent circuit diagram of a liquid crystal device according to a first embodiment of the invention.

Next, an electrical structure of the liquid crystal device 100 will be described with reference to FIG. 2. FIG. 2 is an equivalent circuit diagram schematically illustrating an electrical structure of the liquid crystal device 100.

As shown in FIG. 2, a plurality of source lines 6 that correspond to address numbers of S1, S2, ..., Sn−1, and Sn are formed such that they extend in a longitudinal direction of the paper (a Y direction of FIG. 1) at predetermined gaps. In the meantime, a plurality of gate lines 3 that correspond to address numbers of G1, G2, ..., Gm−1, and Gm are formed such that they extend in a horizontal direction of the paper (an X direction of FIG. 1) at predetermined gaps. In the pixel region G of the top surface of the insulating layer 18 which corresponds to the intersection between each source line 6 and each gate line 3, the TFT element 30 having a source electrode, a gate electrode, and a drain electrode, and the pixel electrode 10 are respectively formed. The source side of each TFT element 30 is electrically connected to the corresponding source line 6 through the contact hole (not shown) that is formed in the second insulating layer 18. The gate side of each TFT element 30 is electrically connected to the corresponding gate line 3 through contact holes (not shown) that are formed in the first insulating layer 17 and the second insulating layer 18. The drain side of each TFT element 30 is electrically connected to the corresponding pixel electrode 10.

As described above, each source line 6 and each gate line 3 are electrically connected to the driver IC 40 shown in FIG. 1. In addition, the source circuit provided in the driver IC 40 drives each source line 6, and the gate circuit provided in the driver IC 40 drives each gate line 3.

Specifically, the gate lines 3 are sequentially and exclusively selected in the order of G1, G2, ..., Gm−1, and Gm one by one by the gate circuit provided in the driver IC 40, and the selected gate line 3 is supplied with the gate signal of the selected voltage and the other non-selection gate lines 3 are provided with a gate signal of the non-selection voltage. The source circuit provided in the driver IC 40 supplies the source signal according to the display content to the pixel electrode 10 located at the selected gate line 3 through the corresponding source line 6 and the corresponding TFT element 30. As a result, a display state of the liquid crystal layer 4 is switched to the non-display state or an intermediate display state, and the display operation of the liquid crystal layer 4 is controlled. In addition, in the example of the liquid crystal device 100, the storage capacitor is not provided in each pixel region G, but the corresponding storage capacitor may be provided in each pixel region G, if necessary.

Structure of Various Terminal

Figure 3:
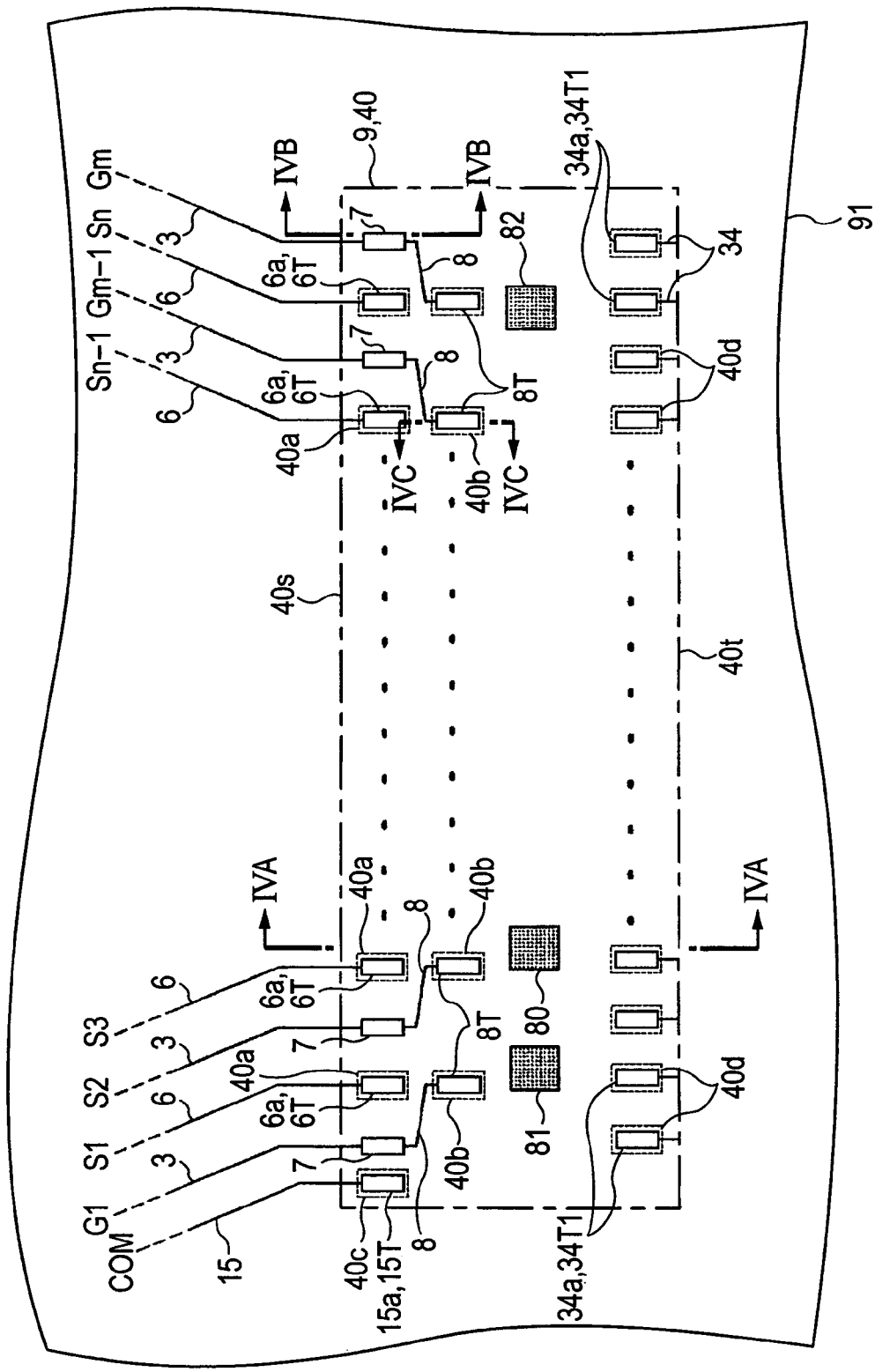
FIG. 3 is a partial enlarged plan view illustrating peripheral portions of a driver IC of an element substrate according to a first embodiment of the invention.

Next, structures of various terminals, which are provided in the extending region 31, will be described with reference to FIGS. 3 to 5. FIG. 3 is a partial enlarged plan view illustrating peripheral portions of the driver IC 40 shown in FIG. 1. For convenience, FIG. 3 shows a perspective view of the driver IC 40.

First, a planar structure of the various terminals, which are provided in the extending region 31, will be described with reference to FIG. 3. Then, the sectional structures of various terminals or the like will be described with reference to FIG. 4.

As shown in FIG. 3, the driver IC 40 includes a plurality of output electrodes (bumps) 40a and 40b, one output electrode (bump) 40c, and a plurality of input electrodes (bumps) 40d, all of which are provided so as to be opposite to element substrate 91.

The respective electrodes 40a are provided on the one side 40s of the driver IC 40 which is located at the effective display region V side. The respective electrodes 40a are provided so as to form a horizontal line in an x direction at predetermined gaps. The electrode 40c is provided on the one side 40s of the driver IC 40 and at a location corresponding to a left corner. The respective electrodes 40d is provided so as to be opposite to one side 40s of the driver IC 40, that is, on one side 40t of the driver IC 40. The respective electrodes 40d are provided to form a horizontal line in an X direction at predetermined gaps. Each electrode 40b is provided between each electrode 40a and each electrode 40d and at a location adjacent to each electrode 40a in a vertical direction in the driver IC 40.

Each terminal 6a, which is provided on one end side of each source line 6, is disposed at a location which overlaps the output-side electrode 40a of the driver IC 40. Each gate line 3 has a connection terminal 7 that serves as an aspect of the connecting wiring line between the terminals 6a that are adjacent to each other in a horizontal direction. As will be described in detail below, each connection terminal 7 electrically connects each terminal 3a (see FIG. 4B) provided on one end side of each gate line 3 and each terminal 8a (see FIG. 4B) provided on one end side of each wiring line 8. Each terminal 8b (see FIG. 4C), which is provided on the other end side of each wiring line 8, is disposed at a location that overlaps the output-side electrode 40b of the driver IC 40 in plan view.

Each of the testing terminals 80, 81, and 82 is used as a testing terminal when the state of the display panel of the liquid crystal device 100 is tested. Although not shown, the testing terminal 80 is electrically connected to each gate line 3 at a predetermined location, and the testing terminal 81 is electrically connected to the wiring line 15 connected to the counter electrode at a predetermined location. Further, the testing terminal 82 is electrically connected to each source line 6 at a predetermined location. For this reason, in the process of manufacturing the liquid crystal device 100, the probe comes into contact with the testing terminals 80, 81, and 82 such that each of them is applied with a predetermined voltage, and thus a state of the display panel of the liquid crystal device 100 can be tested. Further, the testing terminal 80 may be electrically connected to all of the gate lines 3, and the testing terminal 82 may be electrically connected to all of the source lines 6.

The structure of each of the testing terminals 80, 81, and 82 is not limited thereto, but may be as follows. That is, two testing terminals 80 may be provided, and an odd-numbered gate line 3 may be electrically connected to one of the two testing terminals, and an even-numbered gate line 3 may be electrically connected to the other of the two testing terminals. According to this structure, it is possible to easily determine whether shorting occurs between adjacent gate lines 3. In the same manner, two testing terminals 82 may be provided, and an odd-numbered source line 6 may be electrically connected to one of the two testing terminals, and an even-numbered source line 6 may be electrically connected to the other of the two testing terminals. Further, the TFT element (not shown), which controls the electrical connection between these testing terminals 80 and 82, may be formed, and the third testing terminal 80 or 82, which is electrically connected to the gate electrode of the corresponding TFT element, may be separately provided.

Each of the testing terminals 80, 81, and 82 is disposed at a location which overlap the driver IC 40 in plan view and does not overlap each of the plurality of input/output electrodes 40a, 40b, 40c, and 40d of the driver IC 40.

The terminal 34a is provided on one end side of each of the external circuit connecting wiring lines 34, and disposed on one side 40t of the driver IC 40. The respective terminals 34a are disposed so as to form a horizontal line in an X direction at predetermined gaps. In addition, the respective terminals 34a are disposed at locations that overlap the input-side electrodes 40d of the driver IC 40 in plan view.

Figure 4A:
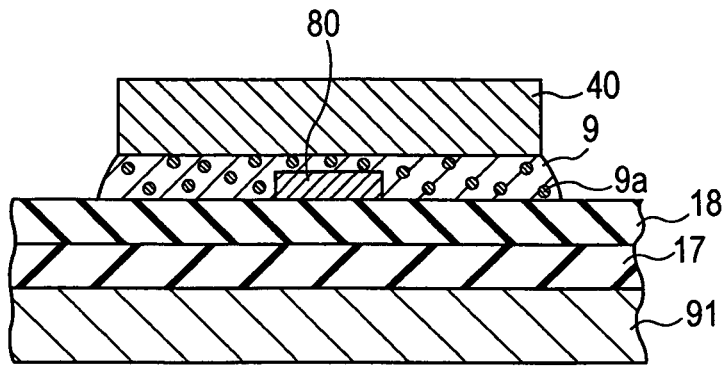
FIG. 4 is a partial cross-sectional view taken along the lines that pass through various terminals in FIG. 3.

Next, a sectional structure, which includes the testing terminal 80 or the like when cut at the location passing through the testing terminal 80, will be described with reference to FIG. 4A. FIG. 4A is a cross-sectional view taken along the line IVA-IVA in FIG. 3.

On the element substrate 91 corresponding to the extending region 31, the first insulating layer 17 is formed, and on the first insulating layer 17, the second insulating layer 18 is formed. In addition, the testing terminal 80 is provided on the second insulating layer 18, and the testing terminal 80 is covered with an anisotropic conductive film 9 (ACF) obtained by dispersing a plurality of metallic particles 9a in a resin containing ah adhesive element. In addition, the driver IC 40 is mounted on the anisotropic conductive film 9. For this reason, the testing terminal 80 two-dimensionally overlaps the driver IC 40 with the anisotropic conductive film 9 interposed therebetween. That is, the testing terminal 80 is disposed at a location which overlaps the driver IC 40 in plan view and dose not overlap each of the plurality of input/output electrodes 40a, 40b, 40c, and 40d of the driver IC 40. The testing terminal 80 is covered with the anisotropic conductive film 9 that is provided below the driver IC 40.

Further, the sectional structure, which includes the testing terminal 81 or the like when cut at a location passing through the testing terminal 81, and the sectional structure, which includes testing terminal 82 or the like when cut at a location passing through the testing terminal 82 are the same as the sectional structure, which includes the testing terminal 80 or the like when cut at a location passing through the testing terminal 80. That is, the testing terminals 81 and 82 are disposed at locations which overlap the driver IC 40 in plan view and do not overlap the plurality of input/output electrodes 40a, 40b, 40c, and 40d of the driver IC 40. The testing terminals 81 and 82 are covered with the anisotropic conductive film 9 that is provided below the driver IC 40.

Figure 4B:
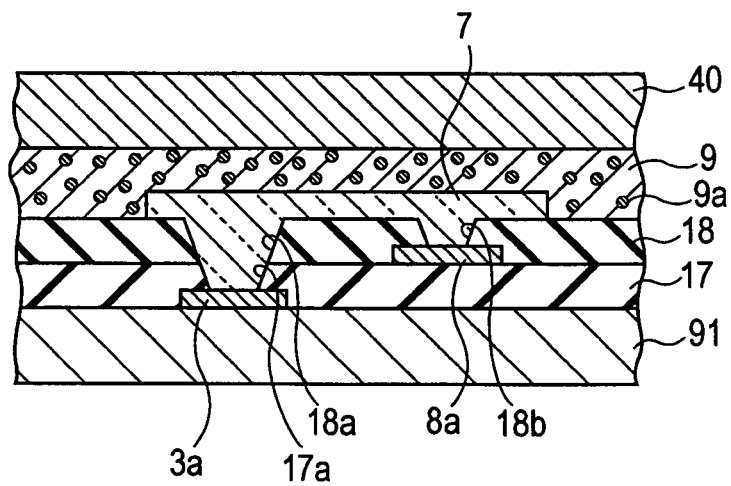

Next, the sectional structure, which includes the connection terminal 7 or the like when cut at the location passing through the connection terminal 7 of the gate line 3, will be described with reference to FIG. 4B. FIG. 4B is a cross-sectional view taken along the line IVB-IVB of FIG. 3.

On the element substrate 91 which corresponds to the extending region 31, the terminal 3a of the gate line 3 is formed. On the part of the element substrate 91 and the terminal 3a, the first insulating layer 17 is formed. For this reason, the terminal 3a of the gate line 3 is located at the same layer as the first insulating layer 17. In addition, the contact hole 17a is provided in the first insulating layer 17 which corresponds to the terminal 3a of the gate line 3. Further, on the first insulating layer 17, a terminal 8*a* is provided which serves as aspect of the interlayer wiring line and provided on one end side of the wiring line 8. On a part of the first insulating layer 17 and the terminal 8*a*, a second insulating layer 18 is formed. For this reason, the terminal 8*a* of the wiring line 8 is located at the same layer as the second insulating layer 18. In addition, a contact hole 18*a* is formed in a portion of the second insulating layer 18 that corresponds to the terminal 3*a* of the gate line 3, and a contact hole 18*b* is formed in a portion of the second insulating layer 18 that corresponds to the terminal 8*a* of the wiring line 8. The contact hole 17*a* communicates with the contact hole 18*a*. On the second insulating layer 18, a connection terminal 7 is formed which is made of a transparent material, such as, for example, ITO or the like. The part of the connection terminal 7 extends to the inside of each of the contact holes 18*a* and 17*a*, and it is electrically connected to the terminal 3*a* of the gate line 3. In addition, the other portion of the connection terminal 7 extends to the inside of the contact hole 18*b* and it is electrically connected to the terminal 8*a* of the wiring line 8. Therefore, the terminal 3*a* of the gate line 3 and the terminal 8*a* of the wiring line 8 are electrically connected to each other through the connection terminal 7. In addition, the connection terminal 7 is covered with the anisotropic conductive film 9, and two-dimensionally overlaps the driver IC 40 which is mounted on the anisotropic conductive film 9.

As such, advantages when the terminal 3*a* of the gate line 3 and the terminal 8*a* of the wiring line 8 are connected to each other by using the connection terminal 7 will be described below. As another method of connecting the terminal 3*a* of the gate line 3 and the terminal 8*a* of the wiring line 8, each of which is formed on a different layer, there is the following method. That is, according to this method, first, the insulating layer 17 is laminated on the terminal 3*a* of the gate line 3, and the contact hole 17*a* is formed in the corresponding insulating layer 17. Next, the terminal 8*a* of the wiring line 8 is formed by filling the forming material of the terminal 8*a* of the wiring line 8 into the contact hole 17*a*, and the insulating layer 18 is laminated on the terminal 8*a* of the wiring line 8. In addition, there is a method of forming the contact hole 18*a* for electrically connecting the terminal 8*a* the wiring line 8 and the surface of the insulating layer 18. In this method, each of the insulating layers 17 and 18 needs to be subjected to a patterning process (formation of the contact holes 17*a* and 18*a*). In the meantime, according to the structure of the above-mentioned embodiment, the insulating layers 17 and 18 can be simultaneously patterned. That is, according to structure of the present embodiment, a patterning process can be omitted once, which results in a decrease of a used photomask.

Alternatively, the gate line 3 may extend to the location which overlaps the terminal 8*a* without using the wiring line 8, and the contact holes may be provided in the two insulating layers 17 and 18 so as to form the terminal 8*a*. However, since it is difficult for the contact hole to be provided in a vertical direction, if the contact holes are provided in the two insulating layers, the size of the contact hole may be increased, as in the contact holes 17*a* and 18*a* of FIG. 4B. Accordingly, in the method of forming the conductive layer that forms the terminal 8*a*, the conductive layer may be sunk into the contact hole, and thus an area of the conductive layer used for connecting the respective input/output electrodes 40*a*, 40*b*, 40*c*, and 40*d* of the driver IC 40 and the terminal 8*a* may become narrower. Therefore, this structure is not preferable.

Figure 4C:
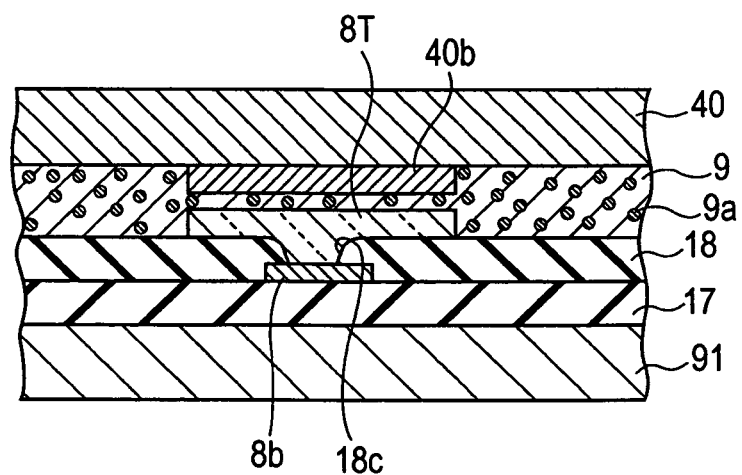

Next, the sectional structure, which includes the terminal 8T provided on the other end side of the wiring line 8 when cut at a location passing through the corresponding terminal 8T, will be described with reference to FIG. 4C. FIG. 4C is a cross-sectional view taken along the line IVC-IVC in FIG. 3.

On the element substrate 91 which corresponds to the extending region 31, the first insulating layer 17 is formed, and on the first insulating layer 17, the terminal 8*b* of the wiring line 8 is formed. On a part of the element substrate 91 and the terminal 8*b*, a second insulating layer 18 is formed. For this reason, the terminal 8*b* of the wiring line 8 is located at the same layer as the second insulating layer 18. In addition, a contact hole 18*c* is formed in a portion of the second insulating layer 18 that corresponds to the terminal 8*b* of the wiring line 8. In addition, the terminal 8T, which is made of the same material as the connection terminal 7, is provided on the second insulating layer 18. The part of the terminal 8T extends to the inside of the contact hole 18*c*, and it is electrically connected to the terminal 8*b* of the wiring line 8. In addition, the terminal 8T is covered with the anisotropic conductive film 9, and two-dimensionally overlaps the output-side electrode 40*b* of the driver IC 40 mounted on the anisotropic conductive film 9. In addition, the terminal 8*b* of the wiring line 8 is electrically connected to the output-side electrode 40*b* of the driver IC 40 through the terminal 8T and the anisotropic conductive film 9.

Further, the sectional structure, which includes each terminal 6T or the like that is provided on each terminal 6*a* of each source line 6 and made of the same material as the terminal 8T when cut at a location passing through each terminal 6T, the sectional structure, which includes each terminal 34T1 or the like that is provided on each terminal 34*a* of each external connection wiring line 34 and made of the same material as the terminal 8T when cut at a location passing through each terminal 34T1, and the sectional structure, which includes each terminal 15T or the like that is provided on the each terminal 15*a* provided on one end side of each wiring line 15 and made of the same material as the terminal 8T when cut at a location passing through each terminal 15T, are substantially the same as the sectional structure, which includes the terminal 8T of the above-mentioned wiring line 8 or the like when cut at a location passing through the terminal 8T. However, in this case, in FIG. 4C, the terminal 6T of the source line 6 is electrically connected to the output-side electrode 40*a* of the driver IC 40 through the anisotropic conductive film 9, the terminal 34T of the external connection wiring line 34 is electrically connected to the input-side electrode 40*d* of the driver IC 40 through the anisotropic conductive film 9, and each terminal 15T of each wiring line 15 is electrically connected to the output-side electrode 40*c* of the driver IC 40 through the anisotropic conductive film 9.

In addition, in the above-mentioned example, the testing terminals 80, 81, and 82 are provided at locations which overlap the driver IC 40 in plan view and do not overlap the plurality of input/output electrodes 40*a*, 40*b*, 40*c*, and 40*d* of the driver IC 40. However, the invention is not limited thereto, but as shown in FIG. 5, the testing terminals 80, 81, and 82 may be provided at locations which overlap the FPC 41 in plan view and do not overlap the plurality of terminals (not shown) that are provided in the plurality of external connection wiring lines 34 and the FPC 41.

In this case, the sectional structure, which includes the testing terminal 80 or the like when cut at a location passing through the testing terminal 80, the sectional structure, which includes the testing terminal 81 or the like when cut at a location passing through the testing terminal 81, and the sectional structure, which includes the testing terminal 82 or the like when cut at a location passing through the testing terminal 82, are the same as the sectional structure, which includes the above-mentioned testing terminal 80 or the like when cut at a location passing through the testing terminal 80. However, in this case, in FIG. 4A, the testing terminals 80, 81 or 82 two-dimensionally overlaps the FPC 41 through the anisotropic conductive film 9. In addition, the sectional structure, which includes each terminal 34T2 that is provided on each terminal 34b provided on the other end side of each external connection wiring line 34 and made of the same material as the terminal 8T when cut at a location passing through each terminal 34T2, is substantially the same as the sectional structure, which includes the terminal 8T of the wiring line 8 when cut at a location passing through the terminal 8T. However, in this case, in FIG. 4C, the terminal 34T2 of the external connecting wiring line 34 is electrically connected to the output-side terminal (not shown) of the FPC 41 through the anisotropic conductive film 9.

As described above, in the liquid crystal device 100 according to the first embodiment, the respective testing terminals 80, 81, and 82 are disposed at locations which two-dimensionally overlap the driver IC 40 and do not overlap the plurality of input/output electrodes 40a, 40b, 40c, and 40d of the driver IC 40, and they are covered with the anisotropic conductive film 9 provided below the driver IC 40. In addition, in stead of the above-mentioned structure, in the liquid crystal device 100 according to the first embodiment, the respective testing terminals 80, 81, and 82 may be disposed at locations which two-dimensionally overlap the FPC 41 and do not overlap the respective terminals provided in the FPC 41 and the respective terminals 34a of the respective external connection wiring lines 34, and they may be covered with the anisotropic conductive film 9 provided below the FPC 41.

Thereby, each of the testing terminals 80, 81, and 82 is covered with the hardened anisotropic conductive film 9 and the driver IC 40 (or FPC 41) in an overlapping manner. Accordingly, it is possible to prevent a foreign material or moisture from adhering to the testing terminals 80, 81, and 82 or prevent the testing terminals 80, 81, and 82 from being contaminated. As a result, it is possible to prevent the shorting from occurring between the respective testing terminals, which results in improving corrosion resistance of the respective testing terminals 80, 81, and 82 (electrolytic corrosion resistance). Further, according to this structure, it is possible to further improve the corrosion resistance, as compared with a case when molding the respective testing terminals 80, 81, and 82 by using an organic resin.

In addition, in the liquid crystal device 100 according to the first embodiment, in addition to the above-mentioned respective testing terminals 80, 81, and 82, each terminal 6T of each source line 6, each terminal 8T of each wiring line 8 that is electrically connected to each gate line 3, the connection terminal 7, the respective terminals 34T1 and 34T2 of the external connecting wiring line 34, and each terminal 15T of each wiring line 15 are also covered with anisotropic conductive film 9, and then covered with the driver IC (or FPC 41). Therefore, it is possible to improve corrosion resistance of these terminals and the respective electrodes (including electrolytic corrosion resistance).

Second Embodiment

Next, structures of various terminals of a liquid crystal device 200 according to a second embodiment of the invention will be described with reference to FIG. 6. FIG. 6 is a plan view schematically illustrating a structure of a liquid crystal device 200 according to a second embodiment of the invention. In FIG. 6, for convenience, only a minimal number of constituent elements are shown. In the below description, the same constituent elements as the first embodiment will be denoted by the same reference numerals, and the description thereof will be omitted or simplified.

The liquid crystal device 200 according to the second embodiment is different from the liquid crystal device 100 according to the first embodiment in that gate circuits and a source circuit are formed on the element substrate 93. In the second embodiment, an LTPS (low temperature poly silicon) type TFT element is used as a TFT element.

As shown in FIG. 6, the liquid crystal device 200 includes an element substrate 93, a color filter substrate 92 (having the same structure as the first embodiment) that is disposed so as to be opposite to the element substrate 93 and bonded to the element substrate 93 through a sealant 5 having a frame shape, and a liquid crystal layer 4 that has liquid crystal sealed inside the sealant 5.

In the element substrate 93, a plurality of source lines 6, a plurality of gate lines 3, a plurality of LTPS-type TFT elements (not shown), a plurality of pixel electrodes 10, a driver IC 40, a plurality of gate circuits 42 as an aspect of a gate line driving circuit, a source circuit 44 as an aspect of a source line driving circuit, external connection wiring lines 34, various wiring lines other than the external connection wiring lines 34, terminals, or the like are formed or mounted.

In an effective display region V, the plurality of source lines 6 are formed so as to extend in a Y direction between the pixel regions G adjacent to each other in an X direction, and the plurality of gate lines 3 are formed so as to extend in an X direction between the pixel regions G adjacent to each other in a Y direction. In the pixel region G which corresponds to an intersection between each source line 6 and each gate line 3, an LTPS-type TFT element and a pixel electrode 10 are provided. The LTPS-type TFT element has a source electrode, a gate electrode, and a drain electrode. The source side of the LTPS-type TFT element is electrically connected to the corresponding source line 6. The gate side of the LTPS-type TFT element is electrically connected to the corresponding gate line 3. The drain side of the LTPS-type TFT element is electrically connected to the corresponding pixel electrode 10.

The driver IC 40 is mounted on the extending region 31 of the element substrate 93.

The source circuit 44 is formed in the extending region 31 on the element substrate 93 and between the driver IC 40 and the effective display region V. The source circuit 44 has a switching circuit 44a. The switching circuit 44a has a function of selectively connecting one wiring line 14 (which will be described in detail below) and any source line 6 of the plurality of source lines 6. One end of one wiring line 14 is electrically connected to the switching circuit 44a. A testing terminal 14a is provided on the other end side of one wiring line 14, and the testing terminal 14a is covered with the anisotropic conducive film 9, and disposed at a location which two-dimensionally overlaps the driver IC 40. In addition, the testing terminals 14a do not overlap the input/output electrodes (bumps) of the driver IC 40 and various terminals that are provided in the mounting region of the driver IC 40 in plan view. In the second embodiment, since the switching circuit 44a is provided in the source circuit 44, in the process of testing a state of a display panel of the liquid crystal device 200, a probe comes into contact with one testing terminal 14a such that a predetermined voltage is applied to one testing terminal 14a, and thus the state of the display panel can be tested without the probe coming into contact with the respective terminals of all of the source lines 6. Therefore, it is possible to reduce time needed for testing the state of the display panel.

The plurality of gate circuits 42 are formed in frame regions 32 which are respectively provided on left and right sides of the paper. Each of the gate circuits 42 has a switching circuit 42a. The switching circuit 42a has a function of selectively connecting one wiring line 13 or 19 and any gate line 3 of the plurality of gate lines 3. One end of one wiring line 13 or 19 is electrically connected to the switching circuit 42a. A testing terminal 13a is provided on the other end side of one wiring line 13, and the testing terminal 19a is provided on the other end side of one wiring line 19. In addition, the testing terminal 13a or 19a is covered with the anisotropic conductive film 9, and disposed at a location which two-dimensionally overlaps the driver IC 40. In addition, the testing terminal 13a or 19a does not overlap the input/output electrodes (bumps) of the driver IC 40 and various terminals that are provided in the mounting region of the driver IC 40 in plan view. In the second embodiment, since the switching circuit 42a is provided in each gate circuit 42, in the process of testing a state of a display panel of the liquid crystal device 200, a probe comes into contact with one testing terminal 13a or 19a such that a predetermined voltage is applied to one testing terminal 13a or 19a, and thus the state of the display panel can be tested without the probe coming into contact with the respective terminals of all of the gate lines 3. Therefore, it is possible to reduce time needed for testing the state of the display panel.

On one end side of each of the source lines 6 between the driver IC 40 and the source circuit 44, a terminal 6T, which serves as an aspect of the source terminal, is provided, and each terminal 6T is covered with the anisotropic conductive film 9 and disposed at a location which two-dimensionally overlaps the driver IC 40. Each terminal 6T is electrically connected to the output-side electrode of the driver IC 40 (not shown) through the anisotropic conductive film 9. In addition, the source line 6, which is located between the driver IC 40 and the source circuit 44, corresponds to a 'source wiring line', in the present embodiment.

In addition, on one end side of each of the gate lines 3 between the driver IC 40 and the gate circuit 42 that is provided on a right side of the paper, a terminal 3T, which serves as an aspect of the gate terminal, is provided, and each terminal 3T is covered with the anisotropic conductive film 9 and disposed at a location which two-dimensionally overlaps the driver IC 40. Each terminal 3T is electrically connected to the output-side electrode of the driver IC 40 (not shown) through the anisotropic conductive film 9. In addition, the gate line 3, which is located between the driver IC 40 and the gate circuit 42, corresponds to a 'gate wiring line' in the present embodiment.

In addition, a wiring line 15 is formed on the left side of the source circuit 44. Similar to the first embodiment, one end of the wiring line 15 is electrically connected to the counter electrode provided on the color filter substrate 92 side in the region E1 in a vertical direction. The testing terminal 15a is provided on the other end side of the wiring line 15, and the corresponding testing terminal 15a is covered with the anisotropic conductive film 9 and disposed at a location which two-dimensionally overlaps the driver IC 40. In addition, the testing terminals 15a do not overlap the input/output electrodes of the driver IC 40 and the various terminals provided in the mounting region of the driver IC 40 in plan view.

As described above, in the liquid crystal device 200 according to the second embodiment, the testing terminals 13a, 14a, 15a, and 19a are provided. For this reason, similar to the first embodiment, in the process of manufacturing the liquid crystal device 200, the probe comes into contact with each of the testing terminals 13a, 14a, 15a, and 19a such that a predetermined voltage is applied to each of them, and thus it is possible to test the state of the display panel of the liquid crystal device 200.

In addition, in the second embodiment, the respective testing terminals 13a, 14a, 15a, and 19a are disposed at locations which two-dimensionally overlap the driver IC 40, and do not overlap the input/output electrodes of the driver IC 40 and the various terminals that are provided in the mounting region of the driver IC 40, and they are covered with the anitostrophic conductive film 9 that are provided below the driver IC 40. Therefore, the same effects as the above-mentioned first embodiment can be obtained.

However, the invention is not limited thereto. For example, the respective testing terminals 13a, 14a, 15a, and 19a are disposed at locations which two-dimensionally overlap the FPC 41, and do not two-dimensionally overlap various terminals provided in the FPC 41 and the plurality of external connection wiring lines 34, such that the same effects as the above-mentioned first embodiment may be obtained.

In addition, in the present embodiment, the wiring line 8 and the connection terminal 7 may be provided between the gate line 3 and the terminal 3T, between the gate line 3 and the testing terminal 13a, and between the gate line 3 and the testing terminal 19a. Similar to the first embodiment, the connection terminal 7 is a terminal for connecting the gate line 3 and the wiring line 8 that is disposed in the different layer from the gate line 3, and the sectional structure thereof is shown in FIG. 4B. The wiring line 8 is formed on the same layer as the source line 6, and connects the connection terminal 7 and the testing terminal 3T, and the testing terminals 13a and 19a.

Third Embodiment

Figure 8:
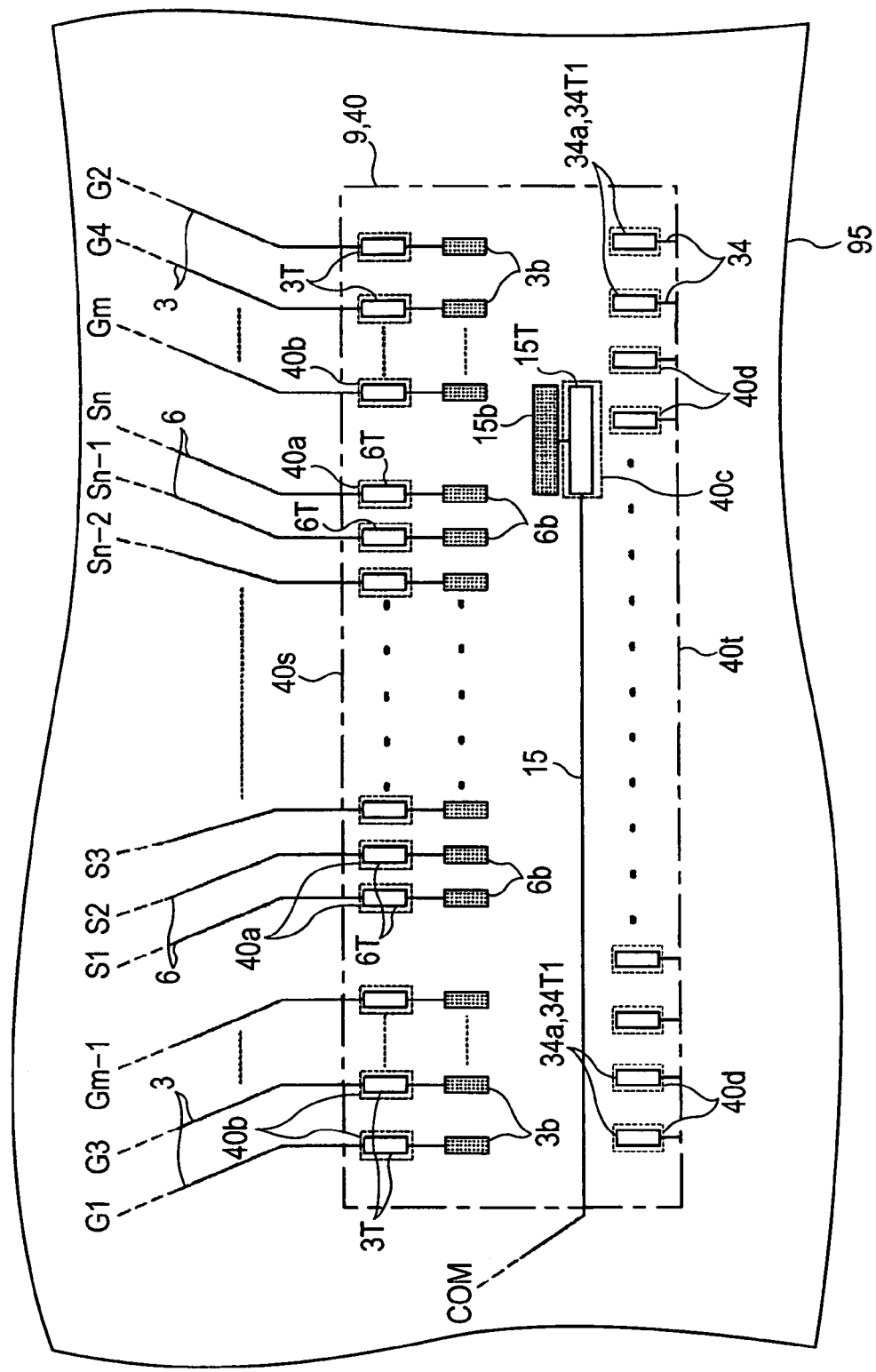
FIG. 8 is a partial enlarged plan view illustrating peripheral portions of a driver IC of an element substrate according to a third embodiment of the invention.
Figure 9:
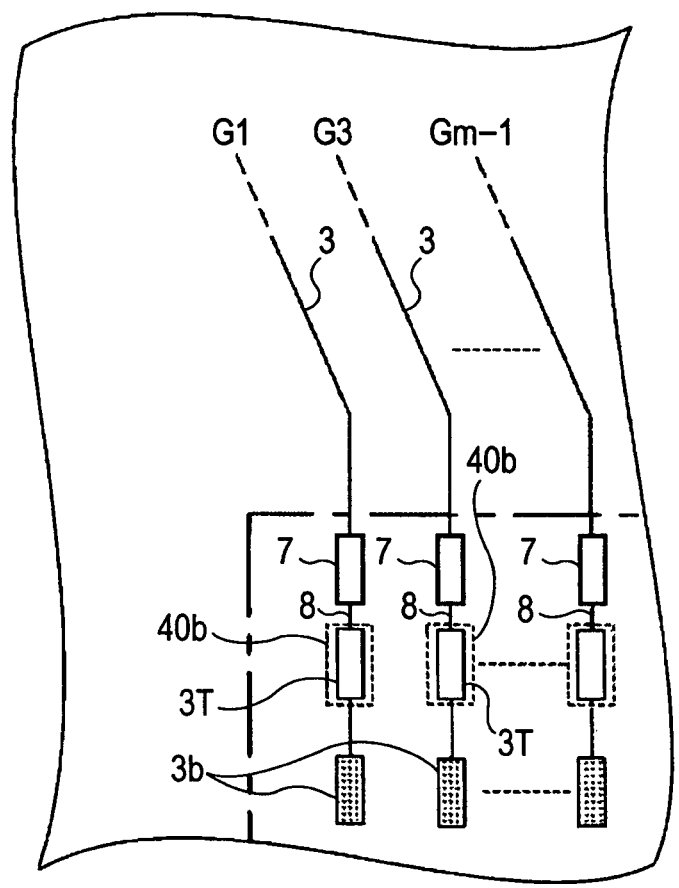
FIG. 9 is a partial enlarged plan view of an element substrate of FIG. 8.

Next, structures of various terminals of a liquid crystal device 300 according to a third embodiment of the invention will be described with reference to FIGS. 7 to 9. FIG. 7 is a plan view schematically illustrating a structure of a liquid crystal device 300 according to a third embodiment of the invention. In FIG. 7, for convenience, only a minimal number of constituent elements are shown. In the below description, the same constituent elements as the first embodiment will be denoted by the same reference numerals, and the description thereof will be omitted or simplified.

The liquid crystal device 300 according to the third embodiment is different from the liquid crystal device according to the first embodiment in that testing terminals are provided in the respective source lines 6 and the respective data lines 3, and the respective testing terminals are covered with the anisotropic conductive film 9 and disposed at locations which two-dimensionally overlap the driver IC 40. In the third embodiment, an a-Si (amorphous silicon) type TFT element is used as a TFT element.

As shown in FIG. 7, the liquid crystal device 300 includes an element substrate 95, a color filter substrate 92 (having the same structure as the first embodiment) that is disposed so as to be opposite to the element substrate 95 and bonded to the element substrate 95 through a sealant 5 having a frame shape, and a liquid crystal layer 4 that has liquid crystal sealed inside the sealant 5.

In the element substrate 95, a plurality of source lines 6, a plurality of gate lines 3, a plurality of a-Si-type TFT elements (not shown), a plurality of pixel electrodes 10, a driver IC 40, external connection wiring lines 34, various wiring lines other than the external connection wiring lines 34, terminals, or the like are formed or mounted.

In an effective display region V, the plurality of source lines 6 are formed so as to extend in a Y direction between the pixel regions G adjacent to each other in an X direction, and the plurality of gate lines 3 are formed so as to extend in an X direction between the pixel regions G adjacent to each other in a Y direction. In the pixel region G which corresponds to an intersection between each source line 6 and each gate line 3, an a-Si-type TFT element and a pixel electrode 10 are provided. In addition, an insulating layer (not shown) is provided at an intersection between each source line 6 and each gate line 3. The a-Si-type TFT element has a source electrode, a gate electrode, and a drain electrode. The source side of the a-Si-type TFT element is electrically connected to the corresponding source line 6. The gate side of the a-Si-type TFT element is electrically connected to the corresponding gate line 3. The drain side of the a-Si-type TFT element is electrically connected to the corresponding pixel electrode 10.

The driver IC 40 is mounted on the extending region 31 of the element substrate 95. One end of each of the source line 6 and the gate line 3 is electrically connected to the driver IC 40. Hereinafter, the structures of the various terminals that are provided in the mounting region of the driver IC 40 in the element substrate 95 will be described with reference to FIG. 8. FIG. 8 is a partial enlarged plan view illustrating peripheral portions of the driver IC 40 in FIG. 7, and FIG. 9 is an enlarged plan view of the corners of FIG. 8. In addition, FIG. 8 is a perspective view of the driver IC 40.

On one end side of each of the gate lines 3 that correspond to odd-numbered address numbers of G1, G3, . . . , and Gm−1, the connection terminal 7, the terminal 3T, and the testing terminal 3b that is electrically connected to the terminal 3T are respectively provided. Similar to the first embodiment, the connection terminal 7 is a terminal for connecting the gate line 3 and the wiring line 8 that is disposed in the different layer from the gate line 3, and the sectional structure thereof is shown in FIG. 4B. The wiring line 8 is formed on the same layer as the source line 6, and connects the connection terminal 7 and the terminal 3T. Each testing terminal 3b is provided at a location below each terminal 3T and adjacent to each terminal 3T. On the element substrate 95, each terminal 3T and each testing terminal 3b are provided on one side 40s of the driver IC 40 and near the left end. Further, on one end side of each of the gate lines 3 that correspond to even-numbered address numbers of G2, G4, . . . , and Gm, the connection terminal 7, the terminal 3T, and the testing terminal 3b that is electrically connected to the terminal 3T are respectively provided. Each testing terminal 3b is provided at a location below each terminal 3T and adjacent to each terminal 3T. On the element substrate 95, each terminal 3T and each testing terminal 3b are provided on one side 40s of the driver IC 40 and near the right end. In this manner, the testing terminal 3b is provided for each gate line 3.

Further, on one end side of each of the source lines 6 that correspond to address numbers of S1, S2, . . . , and Sn, the terminal 6T, and the testing terminal 6b that is electrically connected to the terminal 6T are respectively proved. Each testing terminal 6b is provided at a location below each terminal 6T and adjacent to each terminal 6T. On the element substrate 95, each terminal 6T and each testing terminal 6b are provided on one side 40s of the driver IC 40 and between each terminal 3T of each gate line 3 corresponding to an odd-numbered address number and each terminal 3T of each gate line 3 corresponding to an even-numbered address number. In this manner, the testing terminal 6b is provided for each source line 6.

At locations corresponding to each terminal 3T of each gate line 3 and each terminal 6T of each source line 6, output electrodes 40a and 40b (bumps) of the driver IC 40 are respectively disposed. In addition, each terminal 3T and each terminal 6T are electrically connected to the output electrodes 40a and 40b of the driver IC 40 through the anisotropic conductive film 9. In addition, each testing terminal 3b of each gate line 3 and each testing terminal 6b of each source line 6 are covered with the anisotropic conductive film 9 and disposed at locations which do not overlap the plurality of input/output electrodes of the driver IC 40.

In addition, a wiring line 15, which is electrically connected to the counter electrode of the color filter substrate 92 side, is provided between the source line 6 corresponding to an address number of Sn and the gate line 3 corresponding to an address number of Gm and near the center portion of the driver IC 40. On one end side of the wiring line 15, the terminal 15T, and the testing terminal 15b that is electrically connected to the terminal 15T are provided. The testing terminal 15b is disposed on the terminal 15T. The terminal 15T is electrically connected to the output electrode 40c of the driver IC 40 through the anisotropic conductive film 9. The testing terminal 15b is covered with the anisotropic conductive film 9 and disposed at a location which does not overlap the plurality of input/output electrodes of the driver IC 40.

As described above, in the liquid crystal device 300 according to a third embodiment, the plurality of testing terminals 3b and 6b, and one testing terminal 15b are respectively provided. For this reason, similar to the first embodiment, in the process of manufacturing the liquid crystal device 300, the probe comes into contact with the plurality of testing terminals 3b and 6b, and one testing terminal 15b such that a predetermined voltage is applied to the respective terminals, and thus it is possible to test the state of the display panel of the liquid crystal device 300.

In particular, in the third embodiment, the plurality of testing terminals 3b and 6b, and one testing terminal 15b are disposed at locations which two-dimensionally overlap the driver IC 40 and do not two-dimensionally overlap the input/output electrodes of the driver IC 40, and they are covered with the anisotropic conductive film 9 that is provided below the driver IC 40. Accordingly, the same effects as the first embodiment can be obtained.

However, the invention is not limited thereto. For example, the plurality of testing terminals 3b and 6b, and one testing terminal 15b are disposed at locations which two-dimensionally overlap the FPC 41, and do not overlap various terminals provided in the FPC 41 and the plurality of external connection wiring lines 34, such that the same effects as the above-mentioned first embodiment may be obtained.

Figure 10:
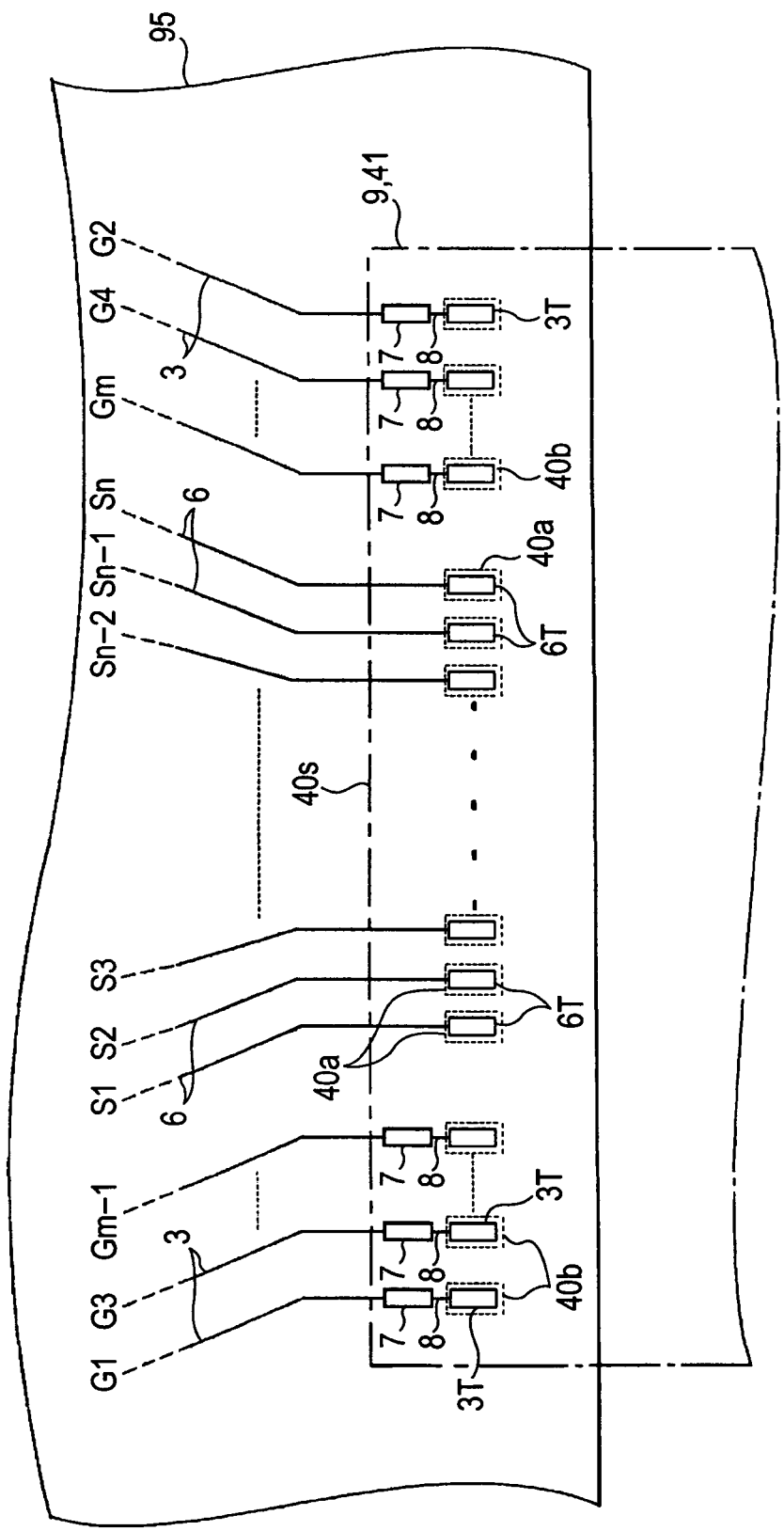
FIG. 10 is a partial enlarged plan view illustrating peripheral portions of an FPC of an element substrate according to a modification of the invention.

A modification of the third embodiment will be described with reference to FIG. 10. FIG. 10 is a partial enlarged plan view illustrating peripheral portions of the mounting region in the liquid crystal display device 300 having a structure in which the FPC 41 is mounted on the extending region of the element substrate 95. Each source line 6 is connected to the driver IC (not shown) that is mounted on the FPC 41 through the terminal 6T and the electrode 40a of the FPC 41. In addition, each gate line 3 is connected to the driver IC (not shown) that is mounted on the FPC 41 through the connection terminal 7, the terminal 3T, and an electrode 40a of the FPC 41.

In this structure, the connection terminal 7, and the terminals 3T and 6T are disposed at locations which two-dimensionally overlap the FPC 41, and they are covered with the anisotropic conductive film 9 that is provided between the FPC 41 and the element substrate 95. Accordingly, the same effect as the first embodiment can be obtained.

Modification

In the respective embodiments, the invention is applied to the liquid crystal device having three-terminal elements, such as various TFT elements or the like. However, the invention is not limited thereto, but may be applied to the liquid crystal device having two-terminal elements.

Electronic Apparatus

Next, embodiments of a case in which the liquid crystal device 100, 200 or 300 according to the above-mentioned first to third embodiments of the invention is used as a display device of an electronic apparatus will be described.

Figure 11:
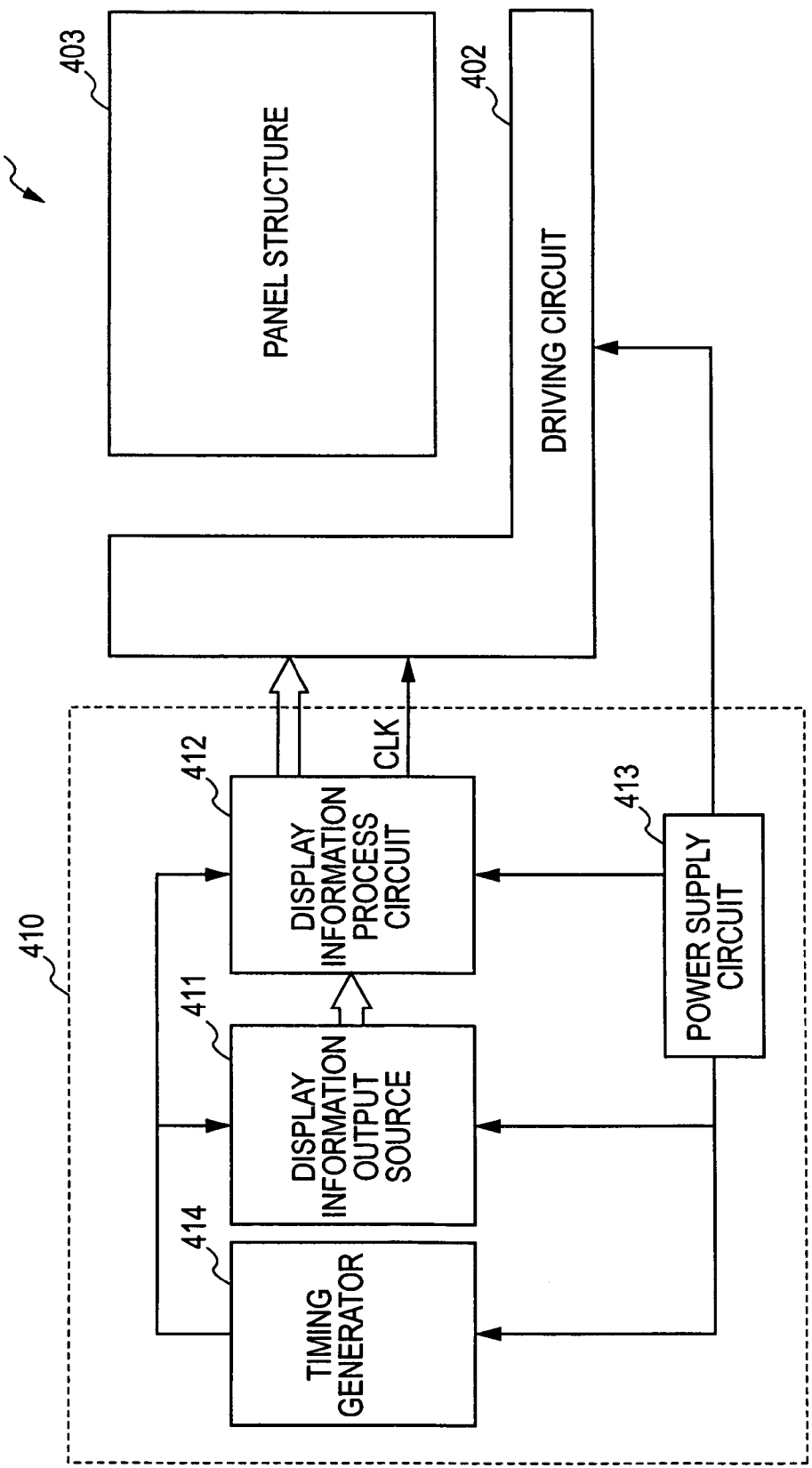
FIG. 11 is a circuit block diagram illustrating an electronic apparatus to which a liquid crystal device according to an embodiment of the invention is applied.

FIG. 11 is a diagram schematically illustrating an entire structure of the present embodiment. The electronic apparatus illustrated in the present embodiment includes the above-mentioned liquid crystal device 100, 200 or 300, and a control unit 410 that controls the liquid crystal device. In this case, the liquid crystal device 100, 200 or 300 is shown in a state in which it is divided into a panel structure 403, and a driving circuit 402 that is composed of a semiconductor IC or the like. In addition, the control unit 410 includes a display information output source 411, a display information process circuit 412, a power supply circuit 413, and a timing generator 414.

The display information output source 411 includes a memory that is composed of an ROM (read only memory) or an RAM (random access memory), a storage unit that is composed of a magnetic recording disk or an optical recording disk, and a tuning circuit that simultaneously outputs the digital image signal. In addition, the display information output source 411 is constructed such that it supplies display information to the display information process circuit 412 in the form of an image signal having a predetermined format on the basis of various clock signals generated by a timing generator 414.

The display information process circuit 412 includes various known circuits, such as a serial-parallel converting circuit, an amplifying/inverting circuit, a rotation circuit, a gamma correcting circuit, a clamp circuit, or the like. The display information process circuit 412 executes the process of the input display information, and supplies the image information to the driving circuit 402 together with the clock signal CLK. The driving circuit 402 includes a scanning line driving circuit, a data line driving circuit, and a test circuit. In addition, the power supply circuit 413 supplies a predetermined voltage to each of the constituent elements.

Next, a specific example of an electronic apparatus to which the liquid crystal device 100, 200 or 300 according to the first to third embodiments of the invention can be applied will be described with reference to FIG. 12.

Figure 12A:
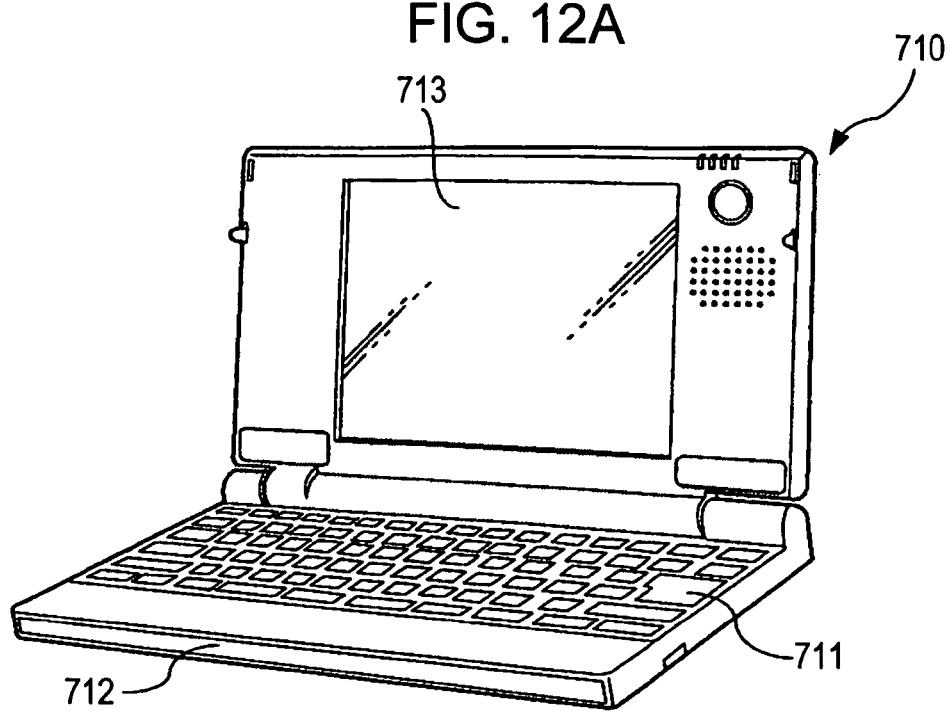
FIG. 12 is a diagram illustrating an example of an electronic apparatus to which a liquid crystal device according to an embodiment of the invention is applied.

First, an example in which the liquid crystal device 100, 200 or 300 according to the first to third embodiment of the invention is applied to a display unit of a mobile personal computer (so-called notebook computer) will be described. FIG. 12A is a perspective view illustrating a structure of a personal computer. As shown in FIG. 12A, a personal computer 710 includes a main body unit 712 that has a keyboard 711, and a display unit 713 in which the liquid crystal device according to the embodiment of the invention is used as the display panel.

Figure 12B:
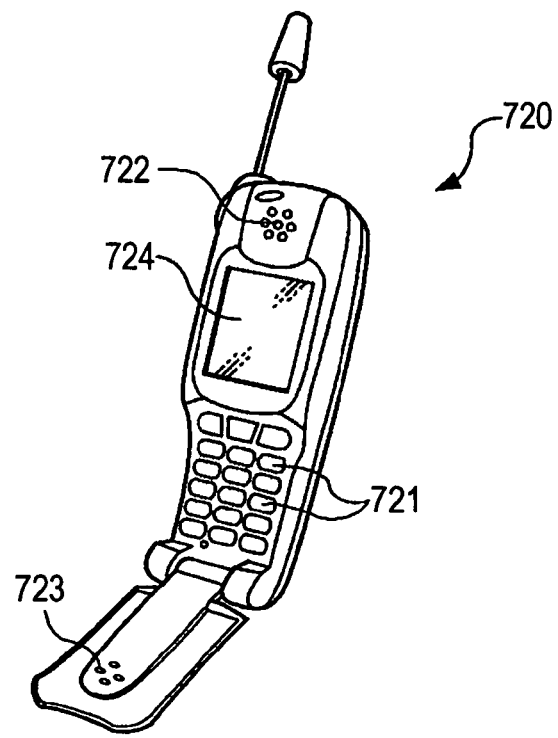

Next, an example in which the liquid crystal device 100, 200 or 300 according to the first to third embodiment of the invention is applied to a display unit of a cellular phone will be described. FIG. 12B is a perspective view illustrating a structure of a cellular phone. As shown in FIG. 12B, a cellular phone 720 includes a plurality of operation buttons 721, an earpiece 722, a mouthpiece 723, and a display unit 724 in which the liquid crystal device according to the first to third embodiments of the invention is used as the display panel.

As electronic apparatuses to which the liquid crystal device 100, 200 or 300 according to the first to third embodiment of the invention can be applied, in addition to the personal computer shown in FIG. 12A and the cellular phone shown in FIG. 12B, a liquid crystal television, a view-finer-type or monitor-direct-view-type video tape recorder, a car navigation device, a pager, an electronic note, an electronic calculator, a word processor, a workstation, a video phone, a POS terminal, a digital still camera, or the like may be exemplified.

What is claimed is:

1. An electro-optical device comprising:
    a substrate;
    a plurality of terminals, a plurality of gate lines, a plurality of source lines, and a plurality of wiring lines that are provided on the substrate, the plurality of terminals including testing terminals that are electrically connected to any one of the gate lines, the source lines, and the wiring line;
    a mounting component that is mounted on the substrate with an anisotropic conductive film interposed therebetween and has a plurality of electrodes; and
    a counter substrate that is disposed so as to be opposite to the substrate and has a counter electrode, the counter electrode being electrically connected to the wiring lines,
    wherein the plurality of terminals are disposed at locations, on the substrate, that two-dimensionally overlap the mounting component, and at locations other than locations that overlap the plurality of electrodes of the mounting component,
    the plurality of terminals are covered with the anisotropic conductive film that are provided between the mounting component and the substrate, and
    each of the testing terminals two-dimensionally overlaps and is encompassed within the mounting component in plan view.

2. The electro-optical device according to claim 1,
    wherein a plurality of insulating layers are laminated on the substrate, and
    the plurality of terminals include connection terminals that connects wiring lines covered with one insulating layer and wiring lines covered with another insulating layer.

3. The electro-optical device according to claim 1, further comprising:
    first wiring lines that are formed on the substrate;
    a first insulating layer that covers the first wiring lines;
    second wiring lines that are formed on the first insulating layer; and
    a second insulating layer that covers the second wiring lines,
    wherein the plurality of terminals include connection terminals that electrically connect the first wiring lines and the second wiring lines through contact holes provided in the first insulating layer and the second insulating layer.

4. The electro-optical device according to claim 1,
    wherein the plurality of source lines and the plurality of the gate lines are provided,
    a source circuit and gate circuit are formed on the substrate, the source circuit driving the plurality of source lines, the gate circuit driving the plurality of gate lines,
    the source circuit has a switching circuit that selectively connects any source line of the plurality of source lines and one wiring line, and the gate circuit has another switching circuit that selectively connects any gate line of the plurality of gate lines and another wiring line, and the plurality of terminals include a testing terminal that is provided at one end of each of one wiring line and another wiring line.

5. The electro-optical device according to claim 1, wherein on the gate lines, the source lines, and the wiring lines, terminals, which are electrically connected to the electrodes of the mounting component, are provided, and the plurality of terminals includes testing terminals that are provided at end portions of the gate lines, the source lines, and the wiring lines.

6. The electro-optical device according to claim 1, wherein the mounting component is an IC or a flexible printed board.

7. An electronic apparatus comprising the electro-optical device according to claim 1 as a display unit.

8. An electro-optical device comprising:
a substrate, the substrate including:
a plurality of gate lines;
first testing terminals;
first wiring lines that are electrically connected to the first testing terminals;
gate line driving circuits that have first switching circuits which selectively connect any gate line of the plurality of gate lines and the first wiring lines, and drive the plurality of gate lines;
a plurality of source lines that cross the plurality of gate lines;
second testing terminals;
second wiring lines that are electrically connected to the second testing terminals;
a source line driving circuit that has a second switching circuit which selectively connects any source line of the plurality of source lines and the second wiring line, and drives the plurality of source lines; and
a mounting component that has a plurality of electrodes, and that is mounted through an adhesive member, the adhesive member covering the first testing terminal and the second testing terminal, wherein
the first and second testing terminals are disposed at locations, on the substrate, that two-dimensionally overlap and are encompassed within the mounting component in plan view, and at locations other than locations that overlap the plurality of electrodes of the mounting component.

9. The electro-optical device according to claim 8, wherein the mounting component has a plurality of electrodes, the substrate includes a gate terminal that is electrically connected to one of the plurality of electrodes, a gate wiring line that is electrically connected to the gate terminal, a source terminal that is electrically connected to another electrode of the plurality of electrodes, and a source wiring line that is electrically connected to the source terminal, the gate line driving circuit is electrically connected to the gate wiring line, and the source line driving circuit is electrically connected to the source wiring line.

* * * * *